United States Patent
Garlapati et al.

(10) Patent No.: US 12,500,695 B2
(45) Date of Patent: Dec. 16, 2025

(54) PARITY CHECK FOR LIST-BASED DECODING

(71) Applicant: QUALCOMM Incorporated, San Diego, CA (US)

(72) Inventors: Shravan Kumar Reddy Garlapati, San Diego, CA (US); Alessandro Risso, San Diego, CA (US); Wei Yang, San Diego, CA (US); Afshin Haftbaradaran, San Diego, CA (US); Li Zhang, San Diego, CA (US); Jing Jiang, San Diego, CA (US); Hobin Kim, San Diego, CA (US); Hari Sankar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 20 days.

(21) Appl. No.: 18/592,077

(22) Filed: Feb. 29, 2024

(65) Prior Publication Data
US 2025/0279851 A1    Sep. 4, 2025

(51) Int. Cl.
*H04L 1/00* (2006.01)

(52) U.S. Cl.
CPC .......... *H04L 1/0061* (2013.01); *H04L 1/0071* (2013.01)

(58) Field of Classification Search
CPC ... H04L 1/0041; H04L 1/0061; H04L 1/0057; H04L 1/0071; H03M 13/09; H03M 13/13; H03M 13/353; H03M 13/3753
See application file for complete search history.

(56) References Cited

U.S. PATENT DOCUMENTS

2019/0363826 A1* 11/2019 Qiao ..................... H04L 1/0057
2021/0152191 A1* 5/2021 Sarkis ............... H03M 13/3753

FOREIGN PATENT DOCUMENTS

CN          114448448 A  *  5/2022  ............ H03M 13/09

OTHER PUBLICATIONS

Tai et al., An improved CA-SCL decoding algorithm for Polar code, IEEE, pp. 1 to 5. (Year: 2022).*
Yu et al., Hybrid parity-check and CRC aided SCL decoding for polar codes, IEEE, pp. 711 to 716. (Year: 2016).*

* cited by examiner

*Primary Examiner* — Shelly A Chase
(74) *Attorney, Agent, or Firm* — Paul M. McAdams; Harrity & Harrity, LLP

(57) ABSTRACT

Various aspects of the present disclosure generally relate to wireless communication. In some aspects, a first network entity may receive, from a second network entity, an encoded communication. The first network entity may decode the encoded communication to obtain a communication via a list-based decoding scheme that includes respective parity check operations for each list of decoded information of a set of one or more lists of decoded information, the parity check operations being configured to be performed prior to a cyclic redundancy check (CRC) operation for the one or more lists of decoded information. Numerous other aspects are described.

20 Claims, 13 Drawing Sheets

PARITY CHECK FOR LIST-BASED DECODING

FIELD OF THE DISCLOSURE

Aspects of the present disclosure generally relate to wireless communication and specifically relate to techniques, apparatuses, and methods associated with a parity check for list-based decoding.

INTRODUCTION

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

In some aspects, a first network entity for wireless communication includes a processing system configured to: receive, from a second network entity, an encoded communication; and decode the encoded communication to obtain a communication via a list-based decoding scheme that includes respective parity check operations for each list of decoded information of a set of one or more lists of decoded information, the parity check operations being configured to be performed prior to a cyclic redundancy check (CRC) operation for the one or more lists of decoded information.

In some aspects, a first network entity for wireless communication includes a processing system configured to: encode, using a list-decodable coding scheme, first information for a communication to obtain an encoded communication, wherein the encoded communication uses second information that includes CRC information, the first information, and a parity indication, and wherein the CRC information is based on the first information and the parity indication; and transmit, to a second network entity, the encoded communication.

In some aspects, a method of wireless communication performed by a first network entity includes receiving, from a second network entity, an encoded communication; and decoding the encoded communication to obtain a communication via a list-based decoding scheme that includes respective parity check operations for each list of decoded information of a set of one or more lists of decoded information, the parity check operations being configured to be performed prior to a CRC operation for the one or more lists of decoded information.

In some aspects, a method of wireless communication performed by a first network entity includes encoding, using a list-decodable coding scheme, first information for a communication to obtain an encoded communication, wherein the encoded communication includes second information that includes CRC information, the first information, and a parity indication, and wherein the CRC information is based on the first information and the parity indication; and transmitting, to a second network entity, the encoded communication.

In some aspects, a non-transitory computer-readable medium having instructions for wireless communication stored thereon that, when executed by a first network entity, cause the first network entity to: receive, from a second network entity, an encoded communication; and decode the encoded communication to obtain a communication via a list-based decoding scheme that includes respective parity check operations for each list of decoded information of a set of one or more lists of decoded information, the parity check operations being configured to be performed prior to a CRC operation for the one or more lists of decoded information.

In some aspects, a non-transitory computer-readable medium having instructions for wireless communication stored thereon that, when executed by a first network entity, cause the first network entity to: encode, using a list-decodable coding scheme, first information for a communication to obtain an encoded communication, wherein the encoded communication includes second information that includes CRC information, the first information, and a parity indication, and wherein the CRC information is based on the first information and the parity indication; and transmit, to a second network entity, the encoded communication.

In some aspects, an apparatus for wireless communication includes means for receiving, from a network entity, an encoded communication; and means for decoding the encoded communication to obtain a communication via a list-based decoding scheme that includes respective parity check operations for each list of decoded information of a set of one or more lists of decoded information, the parity check operations being configured to be performed prior to a CRC operation for the one or more lists of decoded information.

In some aspects, an apparatus for wireless communication includes means for encoding, using a list-decodable coding scheme, first information for a communication to obtain an encoded communication, wherein the encoded communication includes second information that includes CRC information, the first information, and a parity indication, and wherein the CRC information is based on the first information and the parity indication; and means for transmitting, to a network entity, the encoded communication.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing broadly outlines example features and example technical advantages of examples according to the disclosure. Additional example features and example advantages are described hereinafter.

BRIEF DESCRIPTION OF THE DRAWINGS

The appended drawings illustrate certain example aspects of this disclosure and are therefore not limiting in scope. The same reference numbers in different drawings may identify the same or similar elements.

DETAILED DESCRIPTION

Figure 1:
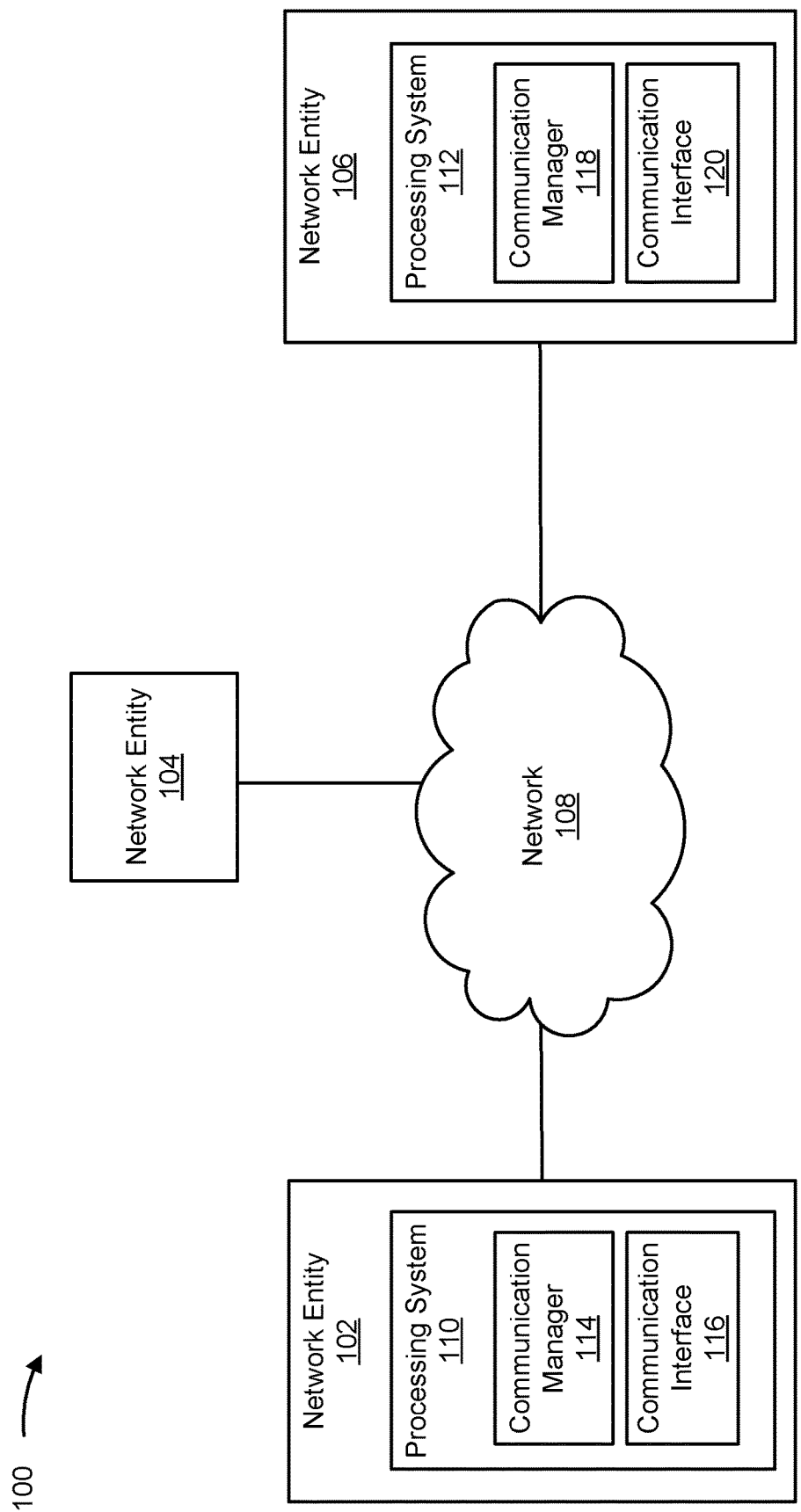
FIG. 1 is a diagram illustrating an example environment in which apparatuses and/or methods described herein may be implemented, in accordance with the present disclosure.

In some wireless communication networks, communication channels may introduce noise, interference, and/or distortion, among other examples, to signals transmitted via the communication channels, such as via thermal noise, interference (e.g., from other signals or devices), attenuation, multipath propagation, and/or other factors. As a result, signals transmitted via the communication channels may experience errors and/or degraded quality, among other examples. To improve the reliability and/or performance of signals transmitted via the communication channels, a channel coding scheme may be used by a transmitter and a receiver. For example, without channel coding, errors introduced during transmission may lead to data corruption and/or data loss, degrading the quality of communications via the communication channels. The channel coding scheme may add redundancy to transmitted data, enabling the receiver to detect and/or correct errors that occur during transmission.

In some examples, the channel coding scheme may include a list-based decoding scheme. As used herein, "list-based" decoding may refer to a decoding operation in which a decoder outputs a list of one or more potential (or possible) solutions (e.g., a list of one or more codewords) when decoding a received signal. "Codeword" may refer to a sequence of bits that are generated by encoding original data (e.g., a payload) using a channel coding scheme. A list-based decoding scheme may also be referred to as a list-decodable coding scheme or similar names. Unlike typical channel coding schemes in which a single best estimate of the received signal (e.g., a single codeword) is output by the decoder, list-based decoding schemes may enable a decoder to output a list of codewords, each of which may represent a valid communication (e.g., a valid set of one or more bits) consistent with the received signal. By providing multiple candidate solutions (e.g., multiple possible codewords), list-based decoding schemes may enable increased robustness and/or reliability, such as in environments associated with high levels of noise or interference and/or in scenarios where channel conditions are highly variable or unpredictable.

In such examples, the receiver may receive and/or detect an encoded communication. The receiver may decode the encoded communication using a decoder. The decoder may obtain one or more log likelihood ratios (LLRs) for use in decoding the encoded communication. The decoder may initialize a list of candidate codewords to be decoded. The decoder may process the LLRs for the received signal by initializing the LLRs for each bit of the candidate codewords based on the received LLRs. The decoder may perform successive cancellation on each bit of the candidate codewords. The decoder may iterate through the bits of each codeword and update the LLRs based on the LLRs of the previously decoded bits and channel characteristics. This successive cancellation process may be repeated until all bits of all codewords in the list are decoded. An output of the decoder 545 may be L codewords (e.g., L candidate codewords), each having a length N.

The receiver may perform a CRC operation using the L codewords. For each candidate codeword in the L codewords, the receiver may determine (e.g., compute) a CRC code (e.g., a CRC checksum). The receiver may compare the computed CRC code to a received CRC code that accompanies the received signal. If the computed CRC code matches the received CRC code, then the receiver may determine that the candidate codeword is likely to be error-free. This may be referred to as a passing CRC. Alternatively, if the computed CRC code does not match the received CRC code, this suggests that errors may be present in the candidate codeword. This may be referred to as a failing CRC. Based on the results of the CRC comparison, the receiver 510 selects the candidate codeword(s) with passing CRCs as the decoded communication(s). These selected codewords represent the final decoded output of the decoding process. If multiple codewords pass the CRC, then the receiver may use additional criteria to select the most likely correct codeword, such as the likelihood metric or other decoding metrics.

As described above, a CRC operation can be used to prune (or eliminate) candidate codewords during list-based decoding. However, performing the CRC operation during the decoding (e.g., on-the-fly while performing the list-based decoding or while performing successive cancellation list decoding) may consume processing resources, may result in additional hardware components included in the decoder (e.g., increasing a hardware area occupied by the decoder), and/or result in increased decoding cycles (e.g., thereby increasing latency of the decoding operation), among other examples. Therefore, the CRC operation may be performed post-decoding (e.g., on each of the L candidate codewords output by the decoder). However, this consumes processing resources, power resources, and/or memory resources, among other examples associated with performing the CRC operation for each of the L candidate codewords output by the decoder.

Various aspects relate generally to a parity check for list-based decoding. Some aspects more specifically relate to a network entity performing a parity check during a list-based decoding operation to prune (e.g., remove) one or more candidate codewords that would have otherwise been output as part of the list-based decoding operation. For example, a first network entity (e.g., that is transmitting an encoded communication) may append or otherwise include a parity indication in information (e.g., a payload of a communication) to be encoded. In some aspects, the parity check may be associated with even parity or odd parity. The first network entity may perform one or more processing operations to encode the information with the parity indication (such as a CRC operation, an interleaving operation, a mapping operation, and/or an encoding operation, among other examples) to generate an encoded communication. The first network entity may transmit the encoded communication.

A second network entity may receive the encoded communication. The second network entity may perform a list-based decoding operation to generate one or more candidate codewords (e.g., one or more lists of decoded information). The second network entity may perform one or more parity checks during the list-based decoding operation (e.g., while bits of the encoded communication are being decoded). For example, the second network entity may perform a parity check for each candidate codeword generated as part of the list-based decoding operation. The second network entity may remove a given candidate codeword (e.g., may prune the given candidate codeword) if the given candidate codeword does not pass the parity check. As a result, in some cases, the second network entity may perform one or more additional processing operations for decoding the encoded communication (such as a CRC operation, a bit extraction operation, or another operation) using less than L candidate codewords (e.g., because one or more candidate codewords may be removed as a result of failing the parity check).

In some aspects, the second network entity may generate partial parity parameters for respective decoded bits decoded by the decoder. For example, the second network entity may track or maintain a parity parameter that is updated as each bit is decoded. The parity parameter may indicate whether a quantity of binary one bits (e.g., bits having a value of one (1)) that have been decoded for a given codeword is an even value or an odd value. As another example, the second network entity may generate partial parity parameters for respective sets of one or more decoded bits. For example, the second network entity may decode a set of one or more bits and generate a parity parameter for the set of one or more bits. The second network entity may continue to decode bits and generate parity parameters for respective sets of one or more decoded bits until all bits of an encoded communication are decoded.

Although some examples are described herein in connection with a list-based decoding scheme, the aspects described herein are similarly applicable to other coding schemes (e.g., non-list-based decoding schemes). For example, the second network entity may perform a parity check to determine whether a decoded codeword passes the parity check prior to performing a CRC operation and/or other processing operations using the decoded codeword, as described in more detail elsewhere herein.

Particular aspects of the subject matter described in this disclosure can be implemented to realize one or more of the following potential advantages. In some examples, the described techniques can be used to reduce the quantity of candidate codewords output by a decoder of the second network entity without significantly increasing hardware overhead and/or without increasing a quantity of decoding cycles used to decode the one or more candidate codewords. For example, by using the parity check(s) during decoding as described herein, the quantity of lists (e.g., of candidate codewords) output by the decoder may be reduced by 40% or more. The lists (e.g., of candidate codewords) pruned (e.g., removed) during the decoding operation (e.g., the list decoding operation) may be candidate codewords that would have otherwise passed one or more metrics (e.g., LLR metrics or other metrics) and/or that would have otherwise undergone additional processing to obtain a decoded communication. Therefore, by using the parity check(s) during decoding as described herein, the second network entity may conserve processing resources, power resources, and/or memory resources, among other examples, that would have otherwise been associated with performing additional processing on candidate codewords that are not valid representations of the communication. Additionally, by using the parity check(s) during decoding as described herein, the second network entity may reduce the latency of the decoding processing by reducing the quantity of codewords for which the additional processing is performed.

Various aspects of the disclosure are described more fully hereinafter with reference to the accompanying drawings. This disclosure may, however, be embodied in many different forms and is not limited to any specific structure, function, example, aspect, or the like presented throughout this disclosure. This disclosure includes, for example, any aspect disclosed herein, whether implemented independently of or combined with any other aspect of the disclosure. For example, an apparatus may be implemented or a method may be practiced using any number of the aspects set forth herein. In addition, the scope of the disclosure includes such an apparatus or method which is practiced using other structure, functionality, or structure and functionality in addition to or other than the various aspects of the disclosure set forth herein. Any aspect of the disclosure disclosed herein may be embodied by one or more elements of a claim.

Aspects and examples generally include a method, apparatus, network node, network entity, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the example concepts disclosed herein, both their organization and method of operation, together with associated example advantages, are described in the following description and in connection with the accompanying figures. Each of the figures is provided for the purposes of illustration and description, and not as a definition of the limits of the claims. Each of the figures is provided for the purposes of illustration and description, and not as a definition of the limits of the claims.

While aspects are described in the present disclosure by illustration to some examples, those skilled in the art understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described example aspects and example features may include additional example components and example features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems are presented with reference to various apparatuses and techniques. These apparatuses and techniques are described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

Multiple-access RATs have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example environment 100 in which apparatuses and/or methods described herein may be implemented, in accordance with the present disclosure. As shown in FIG. 1, the environment 100 may include a network entity 102, a network entity 104, and a network entity 106, that may communicate with one another via a network 108. The network entities 102, 104, and 106, may be dispersed throughout the network 108, and each network entity 102, 104, and 106 may be stationary and/or mobile. The network 108 may include wired communication connections, wireless communication connections, or a combination of wired and wireless communication connections.

The network 108 may include, for example, a cellular network (e.g., a Long-Term Evolution (LTE) network, a code division multiple access (CDMA) network, a 4G network, a 5G network, a 6G network, or another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. The network 108 may include a wireless communication network 200, described in connection with FIG. 2.

As described herein, a network entity (which may alternatively be referred to as an entity, a node, a network node, or a wireless entity) may be, be similar to, include, or be included in (e.g., be a component of) a base station (e.g., any base station described herein, including a disaggregated base station), a UE (e.g., any UE described herein), a reduced capability (RedCap) device, an enhanced reduced capability (eRedCap) device, an ambient internet-of-things (IoT) device, an energy harvesting (EH)-capable device, a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network entity may be a UE. As another example, a network entity may be a base station. As used herein, "network entity" may refer to an entity that is configured to operate in a network, such as the network 108. For example, a "network entity" is not limited to an entity that is currently located in and/or currently operating in the network. Rather, a network entity may be any entity that is capable of communicating and/or operating in the network. A network entity may include a network node 210 or a UE 220, described in more detail in connection with FIG. 2.

The adjectives "first," "second," "third," and so on are used for contextual distinction between two or more of the modified noun in connection with a discussion and are not meant to be absolute modifiers that apply only to a certain respective entity throughout the entire document. For example, a network entity may be referred to as a "first network entity" in connection with one discussion and may be referred to as a "second network entity" in connection with another discussion, or vice versa. As an example, a first network entity may be configured to communicate with a second network entity or a third network entity. In one aspect of this example, the first network entity may be a UE, the second network entity may be a base station, and the third network entity may be a UE. In another aspect of this example, the first network entity may be a UE, the second network entity may be a base station, and the third network entity may be a base station. In yet other aspects of this example, the first, second, and third network entities may be different relative to these examples.

Similarly, reference to a UE, base station, apparatus, device, computing system, or the like may include disclosure of the UE, base station, apparatus, device, computing system, or the like being a network entity. For example, disclosure that a UE is configured to receive information from a base station also discloses that a first network entity is configured to receive information from a second network entity. Consistent with this disclosure, once a specific example is broadened in accordance with this disclosure (e.g., a UE is configured to receive information from a base station also discloses that a first network entity is configured to receive information from a second network entity), the broader example of the narrower example may be interpreted in the reverse, but in a broad open-ended way. In the example above where a UE is configured to receive information from a base station also discloses that a first network entity is configured to receive information from a second network entity, "first network entity" may refer to a first UE, a first base station, a first apparatus, a first device, a first computing system, a first set of one or more one or more components, a first processing entity, or the like configured to receive the information; and "second network entity" may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network entity may be described as being configured to transmit information to a second network entity. In this example and consistent with this disclosure, disclosure that the first network entity is configured to transmit information to the second network entity includes disclosure that the first network entity is configured to provide, send, output, communicate, or transmit information to the second network entity. Similarly, in this example and consistent with this disclosure, disclosure that the first network entity is configured to transmit information to the second network entity includes disclosure that the second network entity is configured to receive, obtain, or decode the information that is provided, sent, output, communicated, or transmitted by the first network entity.

As shown, the network entity 102 may include a processing system 110. Similarly, the network entity 106 may include a processing system 112. A processing system may include one or more components (or subcomponents), such as one or more components described herein. For example, a respective component of the one or more components may be, be similar to, include, or be included in at least one memory, at least one communication interface, or at least one processor. For example, a processing system may include one or more components. In such an example, the one or more components may include a first component, a second component, and a third component. In this example, the first component may be coupled to a second component and a third component. In this example, the first component may be at least one processor, the second component may be a communication interface, and the third component may be at least one memory. A processing system may generally be a system one or more components that may perform one or more functions, such as any function or combination of functions described herein. For example, one or more components may receive input information (e.g., any information that is an input, such as a signal, any digital information, or any other information), one or more components may process the input information to generate output information (e.g., any information that is an output, such as a signal or any other information), one or more components may perform any function as described herein, or any combination thereof.

As described herein, an "input" and "input information" may be used interchangeably. Similarly, as described herein, an "output" and "output information" may be used interchangeably. Any information generated by any component may be provided to one or more other systems or components of, for example, a network entity described herein. For example, a processing system may include a first component configured to receive or obtain information, a second component configured to process the information to generate output information, and/or a third component configured to provide the output information to other systems or components. In this example, the first component may be a communication interface (e.g., a first communication interface), the second component may be at least one processor (e.g., that is coupled to the communication interface and/or at least one memory), and the third component may be a communication interface (e.g., the first communication interface or a second communication interface). For example, a processing system may include at least one memory, at least one communication interface, and/or at least one processor, where the at least one processor may, for example, be coupled to the at least one memory and the at least one communication interface.

A processing system of a network entity described herein may interface with one or more other components of the network entity, may process information received from one or more other components (such as input information), or may output information to one or more other components. For example, a processing system may include a first component configured to interface with one or more other components of the network entity to receive or obtain information, a second component configured to process the information to generate one or more outputs, and/or a third component configured to output the one or more outputs to one or more other components. In this example, the first component may be a communication interface (e.g., a first communication interface), the second component may be at least one processor (e.g., that is coupled to the communication interface and/or at least one memory), and the third component may be a communication interface (e.g., the first communication interface or a second communication interface). For example, a chip or modem of the network entity may include a processing system. The processing system may include a first communication interface to receive or obtain information, and a second communication interface to output, transmit, or provide information. In some examples, the first communication interface may be an interface configured to receive input information, and the information may be provided to the processing system. In some examples, the second system interface may be configured to transmit information output from the chip or modem. The second communication interface may also obtain or receive input information, and the first communication interface may also output, transmit, or provide information.

For example, as shown in FIG. 1, the processing system 110 may include a (e.g., one or more) communication manager 114 and one or more communication interfaces 116. The communication manager 114 may be configured to perform one or more communication tasks as described herein. In some aspects, the communication manager 114 may direct the communication interface 120 and/or the processing system 110 to perform one or more communication tasks as described herein. Similarly, the processing system 112 may include a (e.g., one or more) communication manager 118 and one or more communication interfaces 120. The communication manager 118 may be configured to perform one or more communication tasks as described herein. In some aspects, the processing system 112 and/or the communication manager 118 may direct the communication interface 120 to perform one or more communication tasks as described herein. Although depicted, for clarity of description, with reference only to the network entities 102 and 104, any one or more of the network entities 102, 104, and 106 also may include a communication manager and a communication interface.

As used herein, "communication interface" refers to an interface that enables communication (e.g., wireless communication, wired communication, or a combination thereof) between a first network entity and a second network entity. A communication interface may include electronic circuitry that enables a network entity to transmit, receive, or otherwise perform the communication. A communication interface may be, be similar to, include, or be included in one or more components that are configured to enable communication between the first network entity and the second network entity. For example, a communication interface may include a transmission component, a reception component, and/or a transceiver, among other examples. For example, a communication interface may include one or more transceivers, one or more receivers, and/or one or more transmitters configured to communicate with other devices, such as via a wired connection, a wireless connection, or a combination of wired and wireless connections. In some examples, a communication interface may include one or more RF components, an RF front end, one or more antennas, one or more transmit or receive processors, a demodulation component, and/or a modulation component, among other examples.

A communication interface may include a transmission component and/or a reception component. For example, a communication interface may include a transceiver and/or one or more separate receivers and/or transmitters that enable a network entity to communicate with other devices, such as via a wired connection, a wireless connection, or a combination of wired and wireless connections. In some examples, a communication interface may include one or more radio frequency reflective elements and/or one or more radio frequency refractive elements. The communication interface may enable the network entity to receive information from another apparatus and/or provide information to another apparatus. In some examples, the communication interface may include an Ethernet interface, an optical interface, a coaxial interface, an infrared interface, an RF interface, a universal serial bus (USB) interface, a Wi-Fi interface, a cellular network interface, a wireless modem, an inter-integrated circuit ($I^2C$), and/or a serial peripheral interface (SPI), among other examples.

As described herein, a network entity (e.g., the network entity 102 and/or the network entity 106) may be configured to perform one or more operations. Reference to a network entity being configured to perform one or more operations may refer to a processing system of the network entity being configured to perform the one or more operations and/or the processing system being configured to cause one or more components of the network entity to perform the one or more operations. For example, reference to the processing system being configured to perform one or more operations may refer to one or more components (or subcomponents) of the processing system performing the one or more operations. For example, the one or more components of the processing system may include at least one memory, at least one processor, and/or at least one communication interface, among other examples, that are configured to perform one or more (or all) of the one or more operations, and/or any combination thereof. Where reference is made to the network entity and/or the processing system being configured to perform operations, the network entity and/or the processing system may be configured to cause one component to perform all operations, or to cause more than one component to collectively perform the operations. When the network entity and/or the processing system is configured to cause more than one component to collectively perform the operations, each operation need not be performed by each of those components (e.g., different operations may be performed by different components) and/or each operation need not be performed in whole by only one component (e.g., different components may perform different sub-functions of an operation).

As described in more detail elsewhere herein, the network entity 102 may (e.g., the processing system 110 may, or the processing system 110 may cause the communication manager 114 and/or the communication interface 116 to) receive, from a second network entity, an encoded communication; and/or decode the encoded communication to obtain a communication via a list-based decoding scheme that includes respective parity check operations for each list of decoded information of a set of one or more lists of decoded information, the parity check operations being configured to be performed prior to a CRC operation for the one or more lists of decoded information. Additionally, or alternatively, the network entity 102 and/or the communication manager 114 may perform one or more other operations described herein.

As described in more detail elsewhere herein, the network entity 106 may (e.g., the processing system 112 may, or the processing system 112 may cause the communication manager 114 and/or the communication interface 116 to) encode, using a list-decodable coding scheme, first information for a communication to obtain an encoded communication, wherein the encoded communication uses second information that includes CRC information, the first information, and a parity indication, and wherein the CRC information is based on the first information and the parity indication; and/or transmit, to a second network entity, the encoded communication. Additionally, or alternatively, the network entity 106 and/or the communication manager 118 may perform one or more other operations described herein.

The number and arrangement of entities shown in FIG. 1 are provided as one or more examples. In practice, there may be additional network entities and/or networks, fewer network entities and/or networks, different network entities and/or networks, or differently arranged network entities and/or networks than those shown in FIG. 1. Furthermore, the network entity 102, 104, and 106 may be implemented using a single apparatus or multiple apparatuses.

Figure 2:
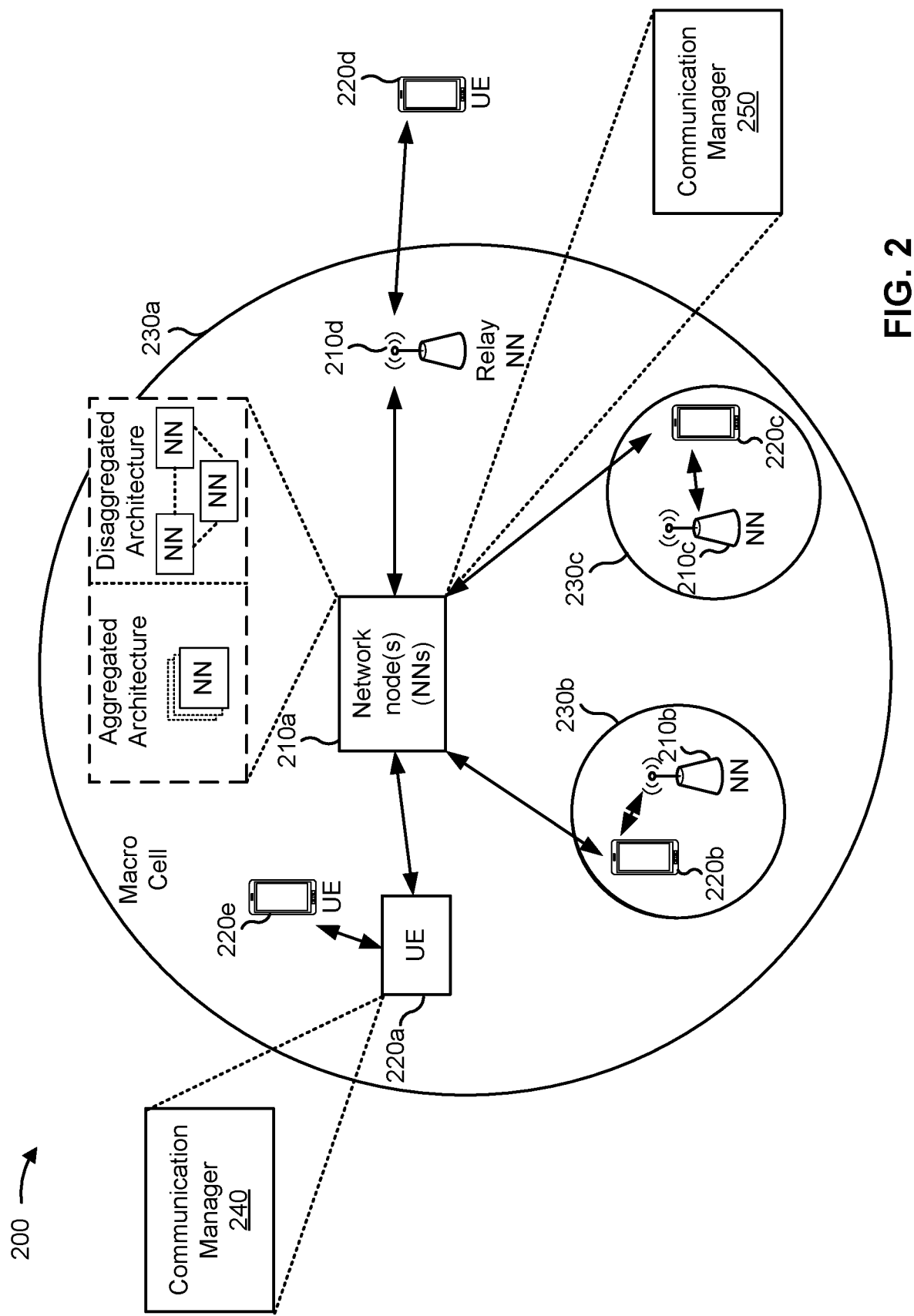
FIG. 2 is a diagram illustrating an example of a wireless communication network, in accordance with the present disclosure.

FIG. 2 is a diagram illustrating an example of a wireless communication network 200 in accordance with the present disclosure. The wireless communication network 200 may be or may include elements of a 5G (or NR) network or a 6G network, among other examples. The wireless communication network 200 may include multiple network nodes 210, shown as a network node (NN) 210a, a network node 210b, a network node 210c, and a network node 210d. The network nodes 210 may support communications with multiple UEs 220, shown as a UE 220a, a UE 220b, a UE 220c, a UE 220d, and a UE 220e.

The network nodes 210 and the UEs 220 of the wireless communication network 200 may communicate using the electromagnetic spectrum, which may be subdivided by frequency or wavelength into various classes, bands, carriers, and/or channels. For example, devices of the wireless communication network 200 may communicate using one or more operating bands. In some aspects, multiple wireless communication networks 200 may be deployed in a given geographic area. Each wireless communication network 200 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHz), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHZ, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 200 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 210 may include one or more devices, components, or systems that enable communication between a UE 220 and one or more devices, components, or systems of the wireless communication network 200. A network node 210 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 210 may be implemented as a single physical node (for example, a single physical structure) or may be implemented as two or more physical nodes (for example, two or more distinct physical structures). For example, a network node 210 may be a device or system that implements part of a radio protocol stack, a device or system that implements a full radio protocol stack (such as a full gNB protocol stack), or a collection of devices or systems that collectively implement the full radio protocol stack. For example, and as shown, a network node 210 may be an aggregated network node (having an aggregated architecture), meaning that the network node 210 may implement a full radio protocol stack that is physically and logically integrated within a single node (for example, a single physical structure) in the wireless communication network 200. For example, an aggregated network node 210 may consist of a single standalone base station or a single TRP that uses a full radio protocol stack to enable or facilitate communication between a UE 220 and a core network of the wireless communication network 200.

Alternatively, and as also shown, a network node 210 may be a disaggregated network node (sometimes referred to as a disaggregated base station), meaning that the network node 210 may implement a radio protocol stack that is physically distributed and/or logically distributed among two or more nodes in the same geographic location or in different geographic locations. For example, a disaggregated network node may have a disaggregated architecture. In some deployments, disaggregated network nodes 210 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 210 of the wireless communication network 200 may include one or more central units (CUs), one or more distributed units (DUs), and/or one or more radio units (RUS). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 220, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 220.

In some aspects, a single network node 210 may include a combination of one or more CUs, one or more DUs, and/or one or more RUs. Additionally or alternatively, a network node 210 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 210 (for example, a base station, an RU, or a TRP) may provide communication coverage for a particular geographic area. In the 3GPP, the term "cell" can refer to a coverage area of a network node 210 or to a network node 210 itself, depending on the context in which the term is used. A network node 210 may support one or multiple (for example, three) cells. In some examples, a network node 210 may provide communication coverage for a macro cell, a pico cell, a femto cell, or another type of cell. A macro cell may cover a relatively large geographic area (for example, several kilometers in radius) and may allow unrestricted access by UEs 220 with service subscriptions. A pico cell may cover a relatively small geographic area and may allow unrestricted access by UEs 220 with service subscriptions. A femto cell may cover a relatively small geographic area (for example, a home) and may allow restricted access by UEs 220 having association with the femto cell (for example, UEs 220 in a closed subscriber group (CSG)). A network node 210 for a macro cell may be referred to as a macro network node. A network node 210 for a pico cell may be referred to as a pico network node. A network node 210 for a femto cell may be referred to as a femto network node or an in-home network node. In some examples, a cell may not necessarily be stationary. For example, the geographic area of the cell may move according to the location of an associated mobile network node 210 (for example, a train, a satellite base station, an unmanned aerial vehicle, or a non-terrestrial network (NTN) network node).

The wireless communication network 200 may be a heterogeneous network that includes network nodes 210 of different types, such as macro network nodes, pico network nodes, femto network nodes, relay network nodes, aggregated network nodes, and/or disaggregated network nodes, among other examples. In the example shown in FIG. 1, the network node 210a may be a macro network node for a macro cell 230a, the network node 210b may be a pico network node for a pico cell 230b, and the network node 210c may be a femto network node for a femto cell 230c. Various different types of network nodes 210 may generally transmit at different power levels, serve different coverage areas, and/or have different impacts on interference in the wireless communication network 200 than other types of network nodes 210. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 210 may be, may include, or may operate as an RU, a TRP, or a base station that communicates with one or more UEs 220 via a radio access link (which may be referred to as a "Uu" link). The radio access link may include a downlink and an uplink. "Downlink" (or "DL") refers to a communication direction from a network node 210 to a UE 220, and "uplink" (or "UL") refers to a communication direction from a UE 220 to a network node 210. Downlink channels may include one or more control channels and one or more data channels. A downlink control channel may be used to transmit downlink control information (DCI) (for example, scheduling information, reference signals, and/or configuration information) from a network node 210 to a UE 220. A downlink data channel may be used to transmit downlink data (for example, user data associated with a UE 220) from a network node 210 to a UE 220. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 220 to a network node 210. An uplink data channel may be used to transmit uplink data (for example, user data associated with a UE 220) from a UE 220 to a network node 210. Uplink control channels may include one or more physical uplink control channels (PUCCHs), and uplink data channels may include one or more physical uplink shared channels (PUSCHs). The downlink and the uplink may each include a set of resources on which the network node 210 and the UE 220 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into BWPs. A BWP may be a block of frequency domain resources (for example, a block of resource blocks) that are allocated for one or more UEs 220. A UE 220 may be configured with both an uplink BWP and a downlink BWP (where the uplink BWP and the downlink BWP may be the same BWP or different BWPs). A BWP may be dynamically configured (for example, by a network node 210 transmitting a DCI configuration to the one or more UEs 220) and/or reconfigured, which means that a BWP can be adjusted in real-time (or near-real-time) based on changing network conditions in the wireless communication network 200 and/or based on the specific requirements of the one or more UEs 220. This enables more efficient use of the available frequency domain resources in the wireless communication network 200 because fewer frequency domain resources may be allocated to a BWP for a UE 220 (which may reduce the quantity of frequency domain resources that a UE 220 is required to monitor), leaving more frequency domain resources to be spread across multiple UEs 220. Thus, BWPs may also assist in the implementation of lower-capability UEs 220 by facilitating the configuration of smaller bandwidths for communication by such UEs 220.

As indicated above, a BWP may be configured as a subset or a part of a total or full component carrier bandwidth and generally forms or encompasses a set of common resource blocks (CRBs) within the full component carrier bandwidth. In other words, within the carrier bandwidth, a BWP starts at a CRB and may span a set of CRBs. Each BWP may be associated with its own numerology (indicating a sub-carrier spacing (SCS) and cyclic prefix (CP)). A UE 220 may be configured with up to four downlink BWPs and up to four uplink BWPs for each serving cell. To enable reasonable UE battery consumption, only one BWP in the downlink and one BWP in the uplink are generally active at a given time on an active serving cell under typical operation. The active BWP defines the operating bandwidth of the UE 220 within the operating bandwidth of the serving cell while all other BWPs with which the UE 220 is configured are deactivated. On deactivated BWPs, the UE 220 does not transmit or receive any communications.

As described above, in some aspects, the wireless communication network 200 may be, may include, or may be included in, an IAB network. In an IAB network, at least one network node 210 is an anchor network node that communicates with a core network. An anchor network node 210 may also be referred to as an IAB donor (or "IAB-donor"). The anchor network node 210 may connect to the core network via a wired backhaul link. For example, an Ng interface of the anchor network node 210 may terminate at the core network. Additionally or alternatively, an anchor network node 210 may connect to one or more devices of the core network that provide a core access and mobility management function (AMF). An IAB network also generally includes multiple non-anchor network nodes 210, which may also be referred to as relay network nodes or simply as IAB nodes (or "IAB-nodes"). Each non-anchor network node 210 may communicate directly with the anchor network node 210 via a wireless backhaul link to access the core network, or may communicate indirectly with the anchor network node 210 via one or more other non-anchor network nodes 210 and associated wireless backhaul links that form a backhaul path to the core network. Some anchor network node 210 or other non-anchor network node 210 may also communicate directly with one or more UEs 220 via wireless access links that carry access traffic. In some examples, network resources for wireless communication (such as time resources, frequency resources, and/or spatial resources) may be shared between access links and backhaul links.

In some examples, any network node 210 that relays communications may be referred to as a relay network node, a relay station, or simply as a relay. A relay may receive a transmission of a communication from an upstream station (for example, another network node 210 or a UE 220) and transmit the communication to a downstream station (for example, a UE 220 or another network node 210). In this case, the wireless communication network 200 may include or be referred to as a "multi-hop network." In the example shown in FIG. 1, the network node 210d (for example, a relay network node) may communicate with the network node 210a (for example, a macro network node) and the UE 220d in order to facilitate communication between the network node 210a and the UE 220d. Additionally or alternatively, a UE 220 may be or may operate as a relay station that can relay transmissions to or from other UEs 220. A UE 220 that relays communications may be referred to as a UE relay or a relay UE, among other examples.

The UEs 220 may be physically dispersed throughout the wireless communication network 200, and each UE 220 may be stationary or mobile. A UE 220 may be, may include, or may be included in an access terminal, another terminal, a mobile station, or a subscriber unit. A UE 220 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an extended reality (XR) device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 220 and/or a network node 210 may include one or more chips, system-on-chips (SoCs), chipsets, packages, or devices that individually or collectively constitute or comprise a processing system (such as the processing system 110 and/or the processing system 112). The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 220 may include or may be included in a housing that houses components associated with the UE 220 including the processing system.

Some UEs 220 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs". An MTC UE may be, may include, or may be included in or coupled with a robot, an unmanned aerial vehicle or drone, a remote device, a sensor, a meter, a monitor, and/or a location tag. Some UEs 220 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 220 may be considered Customer Premises Equipment, which may include telecommunications devices that are installed at a customer location (such as a home or office) to enable access to a service provider's network (such as included in or in communication with the wireless communication network 200).

Some UEs 220 may be classified according to different categories in association with different complexities and/or different capabilities. UEs 220 in a first category may facilitate massive IoT in the wireless communication network 200, and may offer low complexity and/or cost relative to UEs 220 in a second category. UEs 220 in a second category may include mission-critical IoT devices, legacy UEs, baseline UEs, high-tier UEs, advanced UEs, full-capability UEs, and/or premium UEs that are capable of ultra-reliable low-latency communication (URLLC), enhanced mobile broadband (eMBB), and/or precise positioning in the wireless communication network 200, among other examples. A third category of UEs 220 may have mid-tier complexity and/or capability (for example, a capability between UEs 220 of the first category and UEs 220 of the second capability). A UE 220 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 220 (for example, shown as UE 220a and UE 220e) may communicate directly with one another using sidelink communications (for example, without communicating by way of a network node 210 as an intermediary). As an example, the UE 220a may directly transmit data, control information, or other signaling as a sidelink communication to the UE 220e. This is in contrast to, for example, the UE 220a first transmitting data in an UL communication to a network node 210, which then transmits the data to the UE 220e in a DL communication. In various examples, the UEs 220 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 210 may schedule and/or allocate resources for sidelink communications between UEs 220 in the wireless communication network 200. In some other deployments and configurations, a UE 220 (instead of a network node 210) may perform, or collaborate or negotiate with one or more other UEs to perform, scheduling operations, resource selection operations, and/or other operations for sidelink communications.

In various examples, some of the network nodes 210 and the UEs 220 of the wireless communication network 200 may be configured for full-duplex operation in addition to half-duplex operation. A network node 210 or a UE 220 operating in a half-duplex mode may perform only one of transmission or reception during particular time resources, such as during particular slots, symbols, or other time periods. Half-duplex operation may involve time-division duplexing (TDD), in which DL transmissions of the network node 210 and UL transmissions of the UE 220 do not occur in the same time resources (that is, the transmissions do not overlap in time). In contrast, a network node 210 or a UE 220 operating in a full-duplex mode can transmit and receive communications concurrently (for example, in the same time resources). By operating in a full-duplex mode, network nodes 210 and/or UEs 220 may generally increase the capacity of the network and the radio access link. In some examples, full-duplex operation may involve frequency-division duplexing (FDD), in which DL transmissions of the network node 210 are performed in a first frequency band or on a first component carrier and transmissions of the UE 220 are performed in a second frequency band or on a second component carrier different than the first frequency band or the first component carrier, respectively. In some examples, full-duplex operation may be enabled for a UE 220 but not for a network node 210. For example, a UE 220 may simultaneously transmit an UL transmission to a first network node 210 and receive a DL transmission from a second network node 210 in the same time resources. In some other examples, full-duplex operation may be enabled for a network node 210 but not for a UE 220. For example, a network node 210 may simultaneously transmit a DL transmission to a first UE 220 and receive an UL transmission from a second UE 220 in the same time resources. In some other examples, full-duplex operation may be enabled for both a network node 210 and a UE 220.

In some examples, the UEs 220 and the network nodes 210 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

The network node 210 may provide the UE 220 with a configuration of transmission configuration indicator (TCI) states that indicate or correspond to beams that may be used by the UE 220, such as for receiving one or more communications via a physical channel. For example, the network node 210 may indicate (for example, using DCI) an activated TCI state to the UE 220, which the UE 220 may use to generate a beam for receiving one or more communications via the physical channel. A beam indication may be, or may include, a TCI state information element, a beam identifier (ID), spatial relation information, a TCI state ID, a closed loop index, a panel ID, a TRP ID, and/or a sounding reference signal (SRS) set ID, among other examples. A TCI state information element (sometimes referred to as a TCI state herein) may indicate particular information associated with a beam. For example, the TCI state information element may indicate a TCI state identification (for example, a tci-StateID), a quasi-co-location (QCL) type (for example, a qcl-Type1, qcl-Type2, qcl-TypeA, qcl-TypeB, qcl-TypeC, or a qcl-TypeD, among other examples), a cell identification (for example, a ServCellIndex), a bandwidth part identification (bwp-Id), or a reference signal identification, such as a channel state information (CSI) reference signal (CSI-RS) identification (for example, an NZP-CSI-RS-ResourceId or an SSB-Index, among other examples). Spatial relation information may similarly indicate information associated with an uplink beam. The beam indication may be a joint or separate DL/UL beam indication in a unified TCI framework. In a unified TCI framework, a network node 210 may support common TCI state ID update and activation, which may provide common QCL and/or common UL transmission spatial filters across a set of configured component carriers. This type of beam indication may apply to intra-band carrier aggregation, as well as to joint DL/UL and separate DL/UL beam indications. The common TCI state ID may imply that one reference signal determined according to the TCI state(s) indicated by a common TCI state ID is used to provide QCL Type-D indication and to determine UL transmission spatial filters across the set of configured CCs.

In some aspects, the UE 220 may include a communication manager 240. As described in more detail elsewhere herein, the communication manager 240 may receive, from a second network entity, an encoded communication; and/or decode the encoded communication to obtain a communication via a list-based decoding scheme that includes respective parity check operations for each list of decoded information of a set of one or more lists of decoded information, the parity check operations being configured to be performed prior to a CRC operation for the one or more lists of decoded information. Additionally, or alternatively, the communication manager 240 may perform one or more other operations described herein.

In some aspects, the network node 210 may include a communication manager 250. As described in more detail elsewhere herein, the communication manager 250 may encode, using a list-decodable coding scheme, first information for a communication to obtain an encoded communication, wherein the encoded communication uses second information that includes CRC information, the first information, and a parity indication, and wherein the CRC information is based on the first information and the parity indication; and/or transmit, to a second network entity, the encoded communication. Additionally, or alternatively, the communication manager 250 may perform one or more other operations described herein.

Figure 3:
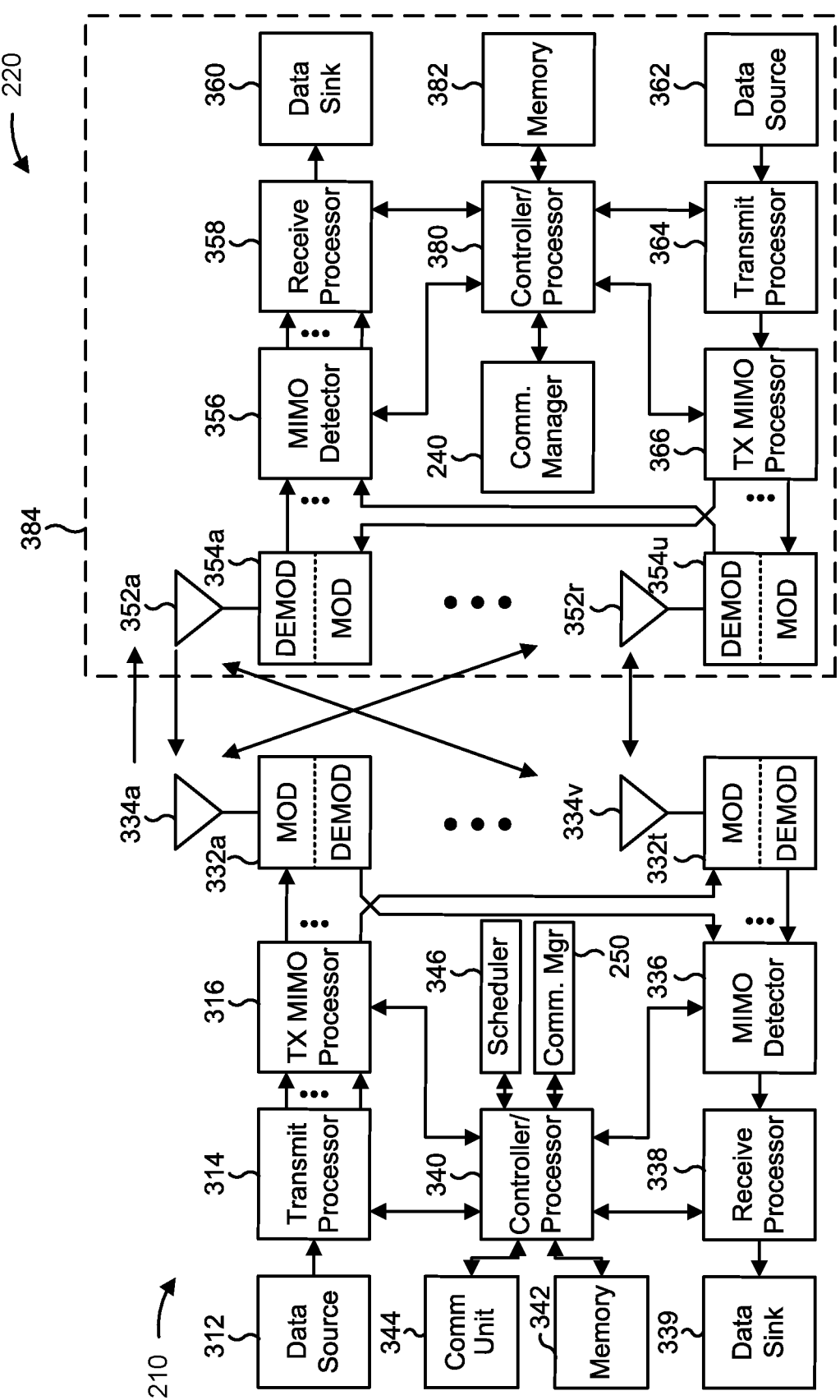
FIG. 3 is a diagram illustrating an example network node in communication with an example UE in a wireless network, in accordance with the present disclosure.

FIG. 3 is a diagram illustrating an example network node 210 in communication with an example UE 220 in a wireless network in accordance with the present disclosure.

As shown in FIG. 3, the network node 210 may include a data source 312, a transmit processor 314, a transmit (TX) MIMO processor 316, a set of modems 332 (shown as 332*a* through 332*t*, where t≥1), a set of antennas 334 (shown as 334*a* through 334*v*, where v≥1), a MIMO detector 336, a receive processor 338, a data sink 339, a controller/processor 340, a memory 342, a communication unit 344, a scheduler 346, and/or a communication manager 250, among other examples. In some configurations, one or a combination of the antenna(s) 334, the modem(s) 332, the MIMO detector 336, the receive processor 338, the transmit processor 314, and/or the TX MIMO processor 316 may be included in a transceiver of the network node 210. The transceiver may be under control of and used by one or more processors, such as the controller/processor 340, and in some aspects in conjunction with processor-readable code stored in the memory 342, to perform aspects of the methods, processes, and/or operations described herein. In some aspects, the network node 210 may include one or more interfaces, communication components, and/or other components that facilitate communication with the UE 220 or another network node.

The terms "processor," "controller," or "controller/processor" may refer to one or more controllers and/or one or more processors. For example, reference to "a/the processor," "a/the controller/processor," or the like (in the singular) refers to any one or more of the processors described in connection with FIG. 3, such as a single processor or a combination of multiple different processors. Reference to "one or more processors" refers to any one or more of the processors described in connection with FIG. 3. For example, one or more processors of the network node 210 may include transmit processor 314, TX MIMO processor 316, MIMO detector 336, receive processor 338, and/or controller/processor 340. Similarly, one or more processors of the UE 220 may include MIMO detector 356, receive processor 358, transmit processor 364, TX MIMO processor 366, and/or controller/processor 380.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" refers to any one or more memories of a corresponding device, such as the memory described in connection with FIG. 3. For example, operation described as being performed by one or more memories can be performed by the same subset of the one or more memories or different subsets of the one or more memories.

For downlink communication from the network node 210 to the UE 220, the transmit processor 314 may receive data ("downlink data") intended for the UE 220 (or a set of UEs that includes the UE 220) from the data source 312 (such as a data pipeline or a data queue). In some examples, the transmit processor 314 may select one or more MCSs for the UE 220 in accordance with one or more channel quality indicators (CQIs) received from the UE 220. The network node 210 may process the data (for example, including encoding the data) for transmission to the UE 220 on a downlink in accordance with the MCS(s) selected for the UE 220 to generate data symbols. The transmit processor 314 may process system information (for example, semi-static resource partitioning information (SRPI)) and/or control information (for example, CQI requests, grants, and/or upper layer signaling) and provide overhead symbols and/or control symbols. The transmit processor 314 may generate reference symbols for reference signals (for example, a cell-specific reference signal (CRS), a demodulation reference signal (DMRS), or a CSI-RS) and/or synchronization signals (for example, a primary synchronization signal (PSS) or a secondary synchronization signals (SSS)).

The TX MIMO processor 316 may perform spatial processing (for example, precoding) on the data symbols, the control symbols, the overhead symbols, and/or the reference symbols, if applicable, and may provide a set of output symbol streams (for example, T output symbol streams) to the set of modems 332. For example, each output symbol stream may be provided to a respective modulator component (shown as MOD) of a modem 332. Each modem 332 may use the respective modulator component to process (for example, to modulate) a respective output symbol stream (for example, for orthogonal frequency division multiplexing (OFDM)) to obtain an output sample stream. Each modem 332 may further use the respective modulator component to process (for example, convert to analog, amplify, filter, and/or upconvert) the output sample stream to obtain a time domain downlink signal. The modems 332a through 332t may together transmit a set of downlink signals (for example, T downlink signals) via the corresponding set of antennas 334.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 200. A data stream (for example, from the data source 312) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 220 to the network node 210, uplink signals from the UE 220 may be received by an antenna 334, may be processed by a modem 332 (for example, a demodulator component, shown as DEMOD, of a modem 332), may be detected by the MIMO detector 336 (for example, a receive (Rx) MIMO processor) if applicable, and/or may be further processed by the receive processor 338 to obtain decoded data and/or control information. The receive processor 338 may provide the decoded data to a data sink 339 (which may be a data pipeline, a data queue, and/or another type of data sink) and provide the decoded control information to a processor, such as the controller/processor 340.

The network node 210 may use the scheduler 346 to schedule one or more UEs 220 for downlink or uplink communications. In some aspects, the scheduler 346 may use DCI to dynamically schedule DL transmissions to the UE 220 and/or UL transmissions from the UE 220. In some examples, the scheduler 346 may allocate recurring time domain resources and/or frequency domain resources that the UE 220 may use to transmit and/or receive communications using an RRC configuration (for example, a semi-static configuration), for example, to perform semi-persistent scheduling (SPS) or to configure a configured grant (CG) for the UE 220.

One or more of the transmit processor 314, the TX MIMO processor 316, the modem 332, the antenna 334, the MIMO detector 336, the receive processor 338, and/or the controller/processor 340 may be included in an RF chain of the network node 210. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 210). In some aspects, the RF chain may be or may be included in a transceiver of the network node 210.

In some examples, the network node 210 may use the communication unit 344 to communicate with a core network and/or with other network nodes. The communication unit 344 may support wired and/or wireless communication protocols and/or connections, such as Ethernet, optical fiber, common public radio interface (CPRI), and/or a wired or wireless backhaul, among other examples. The network node 210 may use the communication unit 344 to transmit and/or receive data associated with the UE 220 or to perform network control signaling, among other examples. The communication unit 344 may include a transceiver and/or an interface, such as a network interface.

The UE 220 may include a set of antennas 352 (shown as antennas 352a through 352r, where r≥1), a set of modems 354 (shown as modems 354a through 354u, where u≥1), a MIMO detector 356, a receive processor 358, a data sink 360, a data source 362, a transmit processor 364, a TX MIMO processor 366, a controller/processor 380, a memory 382, and/or a communication manager 240, among other examples. One or more of the components of the UE 220 may be included in a housing 384. In some aspects, one or a combination of the antenna(s) 352, the modem(s) 354, the MIMO detector 356, the receive processor 358, the transmit processor 364, or the TX MIMO processor 366 may be included in a transceiver that is included in the UE 220. The transceiver may be under control of and used by one or more processors, such as the controller/processor 380, and in some aspects in conjunction with processor-readable code stored in the memory 382, to perform aspects of the methods, processes, or operations described herein. In some aspects, the UE 220 may include another interface, another communication component, and/or another component that facilitates communication with the network node 210 and/or another UE 220.

For downlink communication from the network node 210 to the UE 220, the set of antennas 352 may receive the downlink communications or signals from the network node 210 and may provide a set of received downlink signals (for example, R received signals) to the set of modems 354. For example, each received signal may be provided to a respective demodulator component (shown as DEMOD) of a modem 354. Each modem 354 may use the respective demodulator component to condition (for example, filter, amplify, downconvert, and/or digitize) a received signal to obtain input samples. Each modem 354 may use the respective demodulator component to further demodulate or process the input samples (for example, for OFDM) to obtain received symbols. The MIMO detector 356 may obtain received symbols from the set of modems 354, may perform MIMO detection on the received symbols if applicable, and may provide detected symbols. The receive processor 358 may process (for example, decode) the detected symbols, may provide decoded data for the UE 220 to the data sink 360 (which may include a data pipeline, a data queue, and/or an application executed on the UE 220), and may provide decoded control information and system information to the controller/processor 380.

For uplink communication from the UE 220 to the network node 210, the transmit processor 364 may receive and process data ("uplink data") from a data source 362 (such as a data pipeline, a data queue, and/or an application executed on the UE 220) and control information from the controller/processor 380. The control information may include one or more parameters, feedback, one or more signal measurements, and/or other types of control information. In some aspects, the receive processor 358 and/or the controller/processor 380 may determine, for a received signal (such as received from the network node 210 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a channel quality indicator (CQI) parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 220 by the network node 210.

The transmit processor 364 may generate reference symbols for one or more reference signals, such as an uplink DMRS, an uplink SRS, and/or another type of reference signal. The symbols from the transmit processor 364 may be precoded by the TX MIMO processor 366, if applicable, and further processed by the set of modems 354 (for example, for DFT-s-OFDM or CP-OFDM). The TX MIMO processor 366 may perform spatial processing (for example, precoding) on the data symbols, the control symbols, the overhead symbols, and/or the reference symbols, if applicable, and may provide a set of output symbol streams (for example, U output symbol streams) to the set of modems 354. For example, each output symbol stream may be provided to a respective modulator component (shown as MOD) of a modem 354. Each modem 354 may use the respective modulator component to process (for example, to modulate) a respective output symbol stream (for example, for OFDM) to obtain an output sample stream. Each modem 354 may further use the respective modulator component to process (for example, convert to analog, amplify, filter, and/or upconvert) the output sample stream to obtain an uplink signal.

The modems 354a through 354u may transmit a set of uplink signals (for example, R uplink signals or U uplink symbols) via the corresponding set of antennas 352. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 220) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 352 or the set of antennas 334 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 3. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 334 or an antenna 352 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 220 or network nodes 210 may include different numbers of antenna elements. For example, a UE 220 may include a single antenna element, two antenna elements, four antenna elements, eight antenna elements, or a different number of antenna elements. As another example, a network node 210 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

Figure 4:
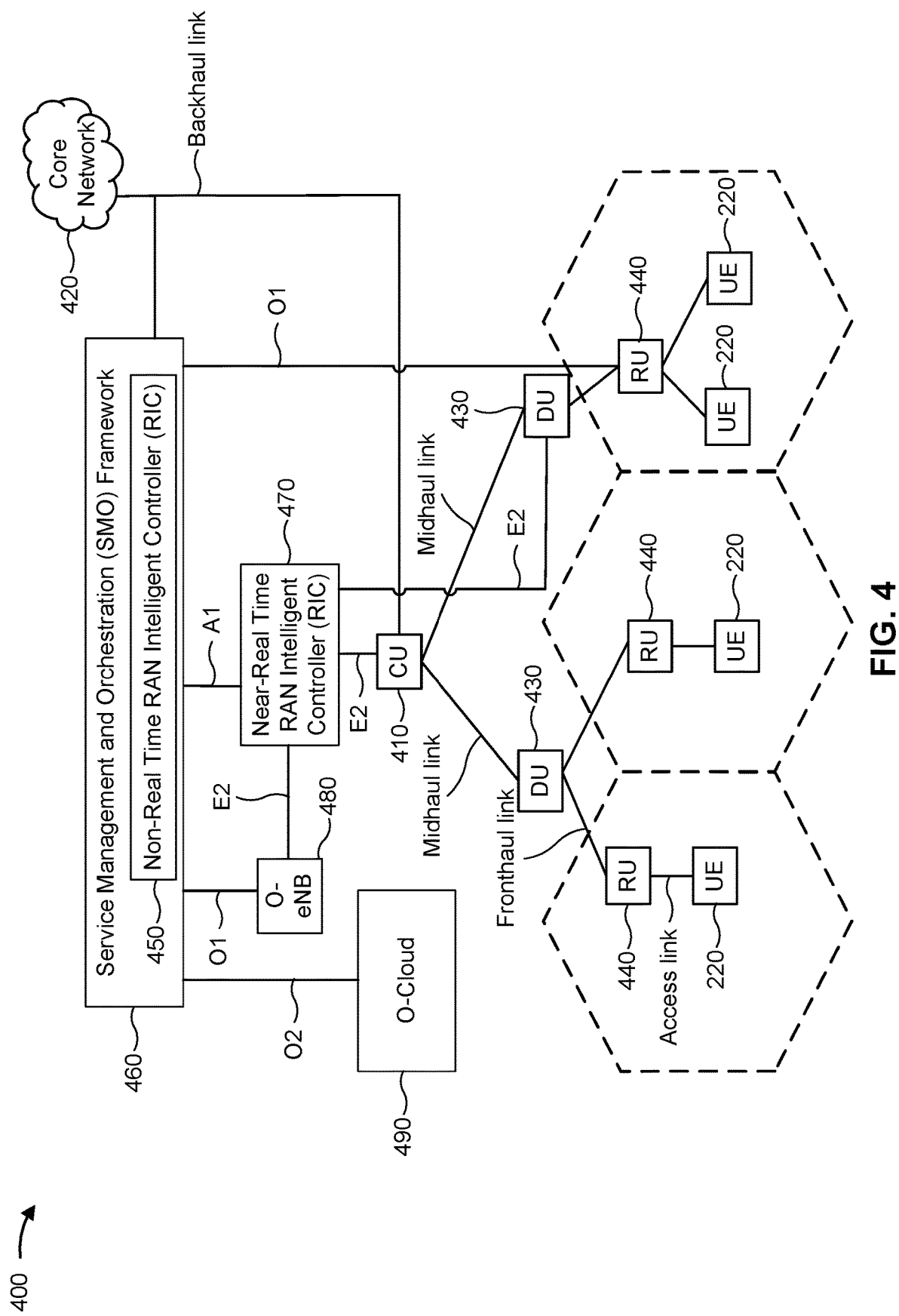
FIG. 4 is a diagram illustrating an example disaggregated base station architecture, in accordance with the present disclosure.

FIG. 4 is a diagram illustrating an example disaggregated base station architecture 400 in accordance with the present disclosure. One or more components of the example disaggregated base station architecture 400 may be, may include, or may be included in one or more network nodes (such one or more network nodes 210). The disaggregated base station architecture 400 may include a CU 410 that can communicate directly with a core network 420 via a backhaul link, or that can communicate indirectly with the core network 420 via one or more disaggregated control units, such as a Non-RT RIC 450 associated with a Service Management and Orchestration (SMO) Framework 460 and/or a Near-RT RIC 470 (for example, via an E2 link). The CU 410 may communicate with one or more DUs 430 via respective midhaul links, such as via F1 interfaces. Each of the DUs 430 may communicate with one or more RUs 440 via respective fronthaul links. Each of the RUs 440 may communicate with one or more UEs 220 via respective RF access links. In some deployments, a UE 220 may be simultaneously served by multiple RUs 440.

Each of the components of the disaggregated base station architecture 400, including the CUs 410, the DUs 430, the RUs 440, the Near-RT RICs 470, the Non-RT RICs 450, and the SMO Framework 460, may include one or more interfaces or may be coupled with one or more interfaces for receiving or transmitting signals, such as data or information, via a wired or wireless transmission medium.

In some aspects, the CU 410 may be logically split into one or more CU-UP units and one or more CU-CP units. A CU-UP unit may communicate bidirectionally with a CU-CP unit via an interface, such as the E1 interface when implemented in an O-RAN configuration. The CU 410 may be deployed to communicate with one or more DUs 430, as necessary, for network control and signaling. Each DU 430 may correspond to a logical unit that includes one or more base station functions to control the operation of one or more RUs 440. For example, a DU 430 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 430, or for communicating signals with the control functions hosted by the CU 410. Each RU 440 may implement lower layer functionality. In some aspects, real-time and non-real-time aspects of control and user plane communication with the RU(s) 440 may be controlled by the corresponding DU 430.

The SMO Framework 460 may support RAN deployment and provisioning of non-virtualized and virtualized network elements. For non-virtualized network elements, the SMO Framework 460 may support the deployment of dedicated physical resources for RAN coverage requirements, which may be managed via an operations and maintenance interface, such as an O1 interface. For virtualized network elements, the SMO Framework 460 may interact with a cloud computing platform (such as an open cloud (O-Cloud) platform 490) to perform network element life cycle management (such as to instantiate virtualized network elements) via a cloud computing platform interface, such as an O2 interface. A virtualized network element may include, but is not limited to, a CU 410, a DU 430, an RU 440, a non-RT RIC 450, and/or a Near-RT RIC 470. In some aspects, the SMO Framework 460 may communicate with a hardware aspect of a 4G RAN, a 5G NR RAN, and/or a 6G RAN, such as an open eNB (O-eNB) 480, via an O1 interface. Additionally or alternatively, the SMO Framework 460 may communicate directly with each of one or more RUs 440 via a respective O1 interface. In some deployments, this configuration can enable each DU 430 and the CU 410 to be implemented in a cloud-based RAN architecture, such as a vRAN architecture.

The Non-RT RIC 450 may include or may implement a logical function that enables non-real-time control and optimization of RAN elements and resources, artificial intelligence and/or machine learning (AI/ML) workflows including model training and updates, and/or policy-based guidance of applications and/or features in the Near-RT RIC 470. The Non-RT RIC 450 may be coupled to or may communicate with (such as via an A1 interface) the Near-RT RIC 470. The Near-RT RIC 470 may include or may implement a logical function that enables near-real-time control and optimization of RAN elements and resources via data collection and actions via an interface (such as via an E2 interface) connecting one or more CUs 410, one or more DUs 430, and/or an O-eNB with the Near-RT RIC 470.

In some aspects, to generate AI/ML models to be deployed in the Near-RT RIC 470, the Non-RT RIC 450 may receive parameters or external enrichment information from external servers. Such information may be utilized by the Near-RT RIC 470 and may be received at the SMO Framework 460 or the Non-RT RIC 450 from non-network data sources or from network functions. In some examples, the Non-RT RIC 450 or the Near-RT RIC 470 may tune RAN behavior or performance. For example, the Non-RT RIC 450 may monitor long-term trends and patterns for performance and may employ AI/ML models to perform corrective actions via the SMO Framework 460 (such as reconfiguration via an O1 interface) or via creation of RAN management policies (such as A1 interface policies).

The network node 210, the controller/processor 340 of the network node 210, the UE 220, the controller/processor 380 of the UE 220, the CU 410, the DU 430, the RU 440, or any other component(s) of FIG. 1, 2, 3 or 4 may implement one or more techniques or perform one or more operations associated with a parity check for list-based decoding, as described in more detail elsewhere herein. For example, the controller/processor 340 of the network node 210, the controller/processor 380 of the UE 220, any other component(s) of FIG. 3, the CU 410, the DU 430, or the RU 440 may perform or direct operations of, for example, process 1000 of FIG. 10, process 1100 of FIG. 11, or other processes as described herein (alone or in conjunction with one or more other processors). The memory 342 may store data and program codes for the network node 210, the network node 210, the CU 410, the DU 430, or the RU 440. The memory 382 may store data and program codes for the UE 220. In some examples, the memory 342 or the memory 382 may include a non-transitory computer-readable medium storing a set of instructions (for example, code or program code) for wireless communication. The memory 342 may include one or more memories, such as a single memory or multiple different memories (of the same type or of different types). The memory 382 may include one or more memories, such as a single memory or multiple different memories (of the same type or of different types). For example, the set of instructions, when executed (for example, directly, or after compiling, converting, or interpreting) by one or more processors of the network node 210, the UE 220, the CU 410, the DU 430, or the RU 440, may cause the one or more processors to perform process 1000 of FIG. 10, process 1100 of FIG. 11, or other processes as described herein. In some examples, executing instructions may include running the instructions, converting the instructions, compiling the instructions, and/or interpreting the instructions, among other examples.

In some aspects, a first network entity includes means for receiving, from a second network entity, an encoded communication; and/or means for decoding the encoded communication to obtain a communication via a list-based decoding scheme that includes respective parity check operations for each list of decoded information of a set of one or more lists of decoded information, the parity check operations being configured to be performed prior to a CRC operation for the one or more lists of decoded information. In some aspects, the means for the first network entity to perform operations described herein may include, for example, one or more of communication manager 250, transmit processor 314, TX MIMO processor 316, modem 332, antenna 334, MIMO detector 336, receive processor 338, controller/processor 340, memory 342, or scheduler 346. In some other aspects, the means for the first network entity to perform operations described herein may include, for example, one or more of communication manager 240, antenna 352, modem 354, MIMO detector 356, receive processor 358, transmit processor 364, TX MIMO processor 366, controller/processor 380, or memory 382.

In some aspects, a first network entity includes means for encoding, using a list-decodable coding scheme, first information for a communication to obtain an encoded communication, wherein the encoded communication uses second information that includes CRC information, the first information, and a parity indication, and wherein the CRC information is based on the first information and the parity indication; and/or means for transmitting, to a second network entity, the encoded communication. In some aspects, the means for the first network entity to perform operations described herein may include, for example, one or more of communication manager 250, transmit processor 314, TX MIMO processor 316, modem 332, antenna 334, MIMO detector 336, receive processor 338, controller/processor 340, memory 342, or scheduler 346. In some other aspects, the means for the first network entity to perform operations described herein may include, for example, one or more of communication manager 240, antenna 352, modem 354, MIMO detector 356, receive processor 358, transmit processor 364, TX MIMO processor 366, controller/processor 380, or memory 382.

Figure 5:
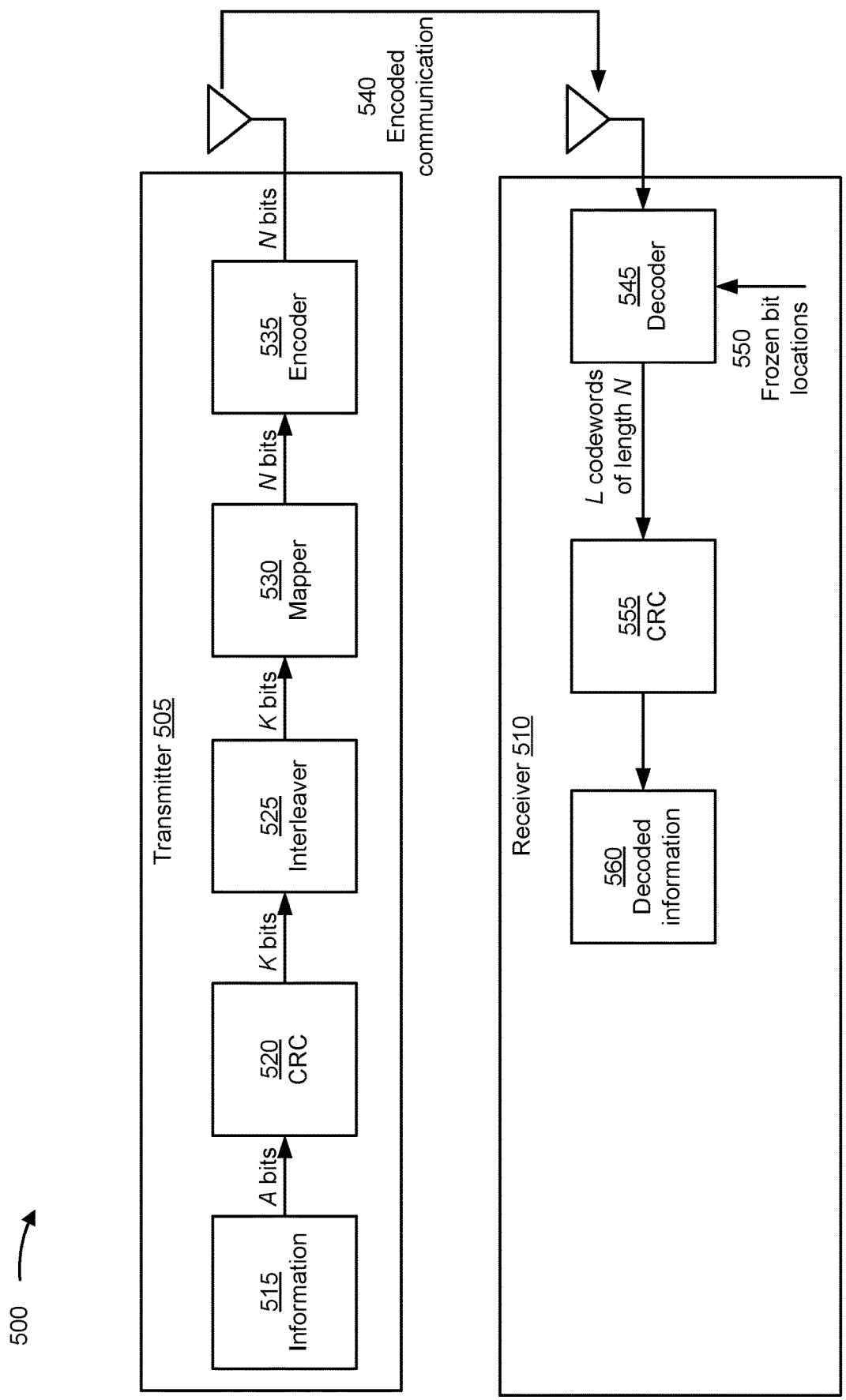
FIG. 5 is a diagram of an example associated with a channel coding scheme for wireless communications, in accordance with the present disclosure.

FIG. 5 is a diagram of an example 500 associated with a channel coding scheme for wireless communications, in accordance with the present disclosure. As shown in FIG. 5, a transmitter 505 may communicate with a receiver 510. The transmitter 505 may be the network entity 102, the network entity 106, a network node 210, a UE 220, a base station, a CU, a DU, and/or an RU. The receiver 510 may be the network entity 102, the network entity 106, a network node 210, a UE 220, a base station, a CU, a DU, and/or an RU. In some aspects, the transmitter 505 may be a network node 210 and the receiver 510 may be a UE 220. In some aspects, the transmitter 505 and the receiver 510 may be part of a wireless network (e.g., the wireless communication network 200). The transmitter 505 and the receiver 510 may have established a wireless connection prior to operations shown in FIG. 5.

The transmitter 505 is an entity that is transmitting a communication in the context of the example 500, and is not an entity that is only capable of transmitting signals (e.g., the transmitter 505 may also be capable of receiving signals, such as in a similar manner as described in connection with the receiver 510). Similarly, the receiver 510 may be an entity that is receiving the communication in the context of the example 500, and is not an entity that is only capable of receiving signals (e.g., the receiver 510 may also be capable of transmitting signals, such as in a similar manner as described in connection with the transmitter 505).

In wireless communication networks (such as the wireless communication network 200), communication channels may introduce noise, interference, and/or distortion, among other examples, to signals transmitted via the communication channels, such as via thermal noise, interference (e.g., from other signals or devices), attenuation, multipath propagation, and/or other factors. As a result, signals transmitted via the communication channels may experience errors and/or degraded quality, among other examples. To improve the reliability and/or performance of signals transmitted via the communication channels, a channel coding scheme may be used by the transmitter 505 and the receiver 510. For example, without channel coding, errors introduced during transmission may lead to data corruption and/or data loss, degrading the quality of communications via the communication channels. The channel coding scheme may add redundancy to transmitted data, enabling the receiver 510 to detect and/or correct errors that occur during transmission.

In some examples, the channel coding scheme may be viewed as a linear system (e.g., over a Galois field) with variables and linearly independent constraints. For example, the variables may correspond to source packets and the linearly independent constraints may correspond to encoded packets. Using the linear system, any of the variables that have been subject to an erasure or loss (e.g., transmission error) may be recovered based at least in part on a portion of the original source packets and based at least in part on a portion of the encoded packets. Channel coding (e.g., erasure coding and recovery) may enable receiver 510 to recover a communication that has been lost (e.g., corrupted or otherwise not received) during transmission. The recovery of the lost communication, without requiring retransmission by the transmitter 505, may reduce the overall number of retransmissions by the transmitter 505 and may reduce the overall load on the network.

In some examples, the channel coding scheme may include a list-based decoding scheme. As used herein, "list-based" decoding may refer to a decoding operation in which a decoder outputs a list of one or more potential (or possible) solutions (e.g., a list of one or more codewords) when decoding a received signal. "Codeword" may refer to a sequence of bits that are generated by encoding original data (e.g., a payload) using a channel coding scheme. For example, for polar coding, a codeword may be generated by a recursive application channel polarization to a set of one or more bits (e.g., to a payload of a communication). A codeword May include the original bits (e.g., information bits) and additional redundancy (e.g., one or more redundant bits) introduced by the channel coding scheme to enable error correction.

A list-based decoding scheme may also be referred to as a list-decodable coding scheme or similar names. Unlike typical channel coding schemes in which a single best estimate of the received signal (e.g., a single codeword) is output by the decoder, list-based decoding schemes may enable a decoder to output a list of codewords, each of which may represent a valid communication (e.g., a valid set of one or more bits) consistent with the received signal. By providing multiple candidate solutions (e.g., multiple possible codewords), list-based decoding schemes may enable increased robustness and/or reliability, such is in environments associated with high levels of noise or interference and/or in scenarios where channel conditions are highly variable or unpredictable.

The list-based decoding scheme may include successive cancellation list (SCL) decoding, such as for polar codes. Other examples of list-based decoding schemes include list Viterbi decoding, Reed-Muller decoding, among other examples. Some examples are described herein in connection with polar encoding and decoding as an example. The aspects described herein are similarly applicable to other types of list-based decoding schemes (e.g., list Viterbi decoding, Reed-Muller decoding, or other list-based decoding schemes).

In some examples, channel coding schemes that include list-based decoding may be used for some types of communication channels in a wireless communication network. For example, channel coding schemes that include list-based decoding may be used for control channels (e.g., the PDCCH or the PUCCH) or broadcast channels (e.g., a physical broadcast channel (PBCH)), among other examples. For example, these channel coding schemes may be used for control channels or broadcast channels because of the relatively low decoding complexity, enabling faster and more reliable decoding performance. The faster and more reliable decoding performance may be beneficial for some types of communication channels (e.g., control channels or broadcast channels) that are associated with low latency and high reliability.

As shown in FIG. 5, the transmitter 505 may have information 515 to be transmitted to the receiver 510 via a communication channel. The information 515 may include control information (e.g., DCI or UCI) or other information. As described herein, the information 515 may be encoded using a channel coding scheme that enables list-based decoding at the receiver 510. As shown in FIG. 5, the information 515 may include A bits (e.g., A information bits). The transmitter 505 may perform one or more processing operations to encode and transmit the A bits. For example, the transmitter 505 may perform a CRC operation 520 using the A bits. CRC is an error-detecting code that uses a fixed size CRC code (e.g., a checksum that is based on the information transmitted) that is appended to information (e.g., the information 515) to be transmitted. For example, the CRC operation 520 may include the transmitter 505 determining (e.g., calculating) the CRC code using the information 515 (e.g., using the A bits). For example, the CRC operation 520 may include determining (e.g., calculating) a CRC code having a size of C bits, such as 24 bits (e.g., a 24-bit CRC) or another quantity of bits. The CRC code may be appended to the information 515, resulting in K bits (e.g., where K=A+C).

Additionally, the transmitter 505 may perform a radio network temporary identifier (RNTI) masking operation using the information 515. As an example, an RNTI may be R bits, and the most significant bit (MSB) R-bits of the C-bit CRC may be masked during the RNTI masking. In other words, the RNTI masking may be applied on the MSB R-bits of the C-bit CRC (e.g., where C is greater than or equal to R). The K bits may include the A bits and the C-bit CRC code. As an example, after the attachment of the C-bit CRC code to the A bits, during the RNTI masking, the CRC code (or CRC parity bits) may be scrambled with the RNTI $x_{rnti,0}, x_{rnti,1}, \ldots, x_{rnti,R-1}$, where $x_{rnti,0}$ corresponds to the MSB of the RNTI, to form the sequence of bits $c_0, c_1, c_2, c_3, \ldots, c_{K-1}$.

The transmitter 505 may perform an interleaving operation using an interleaver 525 and the K bits. An output of the interleaver 525 may be interleaved K bits. The transmitter 505 may perform a mapping operation using a mapper 530 and the interleaved K bits. For example, the mapper 530 may map the interleaved K bits to N bits. N may be a code block size of the coding scheme being used to encode the information 515. The transmitter 505 may encode the N bits using an encoder 535. As an example, the encoder 535 may be a polar encoder or another type of encoder. An output of the encoder 535 may be encoded N bits. The encoded N bits may form an encoded communication 540. As shown in FIG. 5, the transmitter 505 may transmit the encoded communication 540 via a communication channel, such as a control channel or a broadcast channel. For example, the transmitter 505 may transmit the encoded communication 540 via an over-the-air communication. In some examples, prior to transmitting the encoded communication, the transmitter 505 may perform a sub-block interleaving operation and/or a rate matching operation using the N bits, which may result in E bits. The E bits may undergo a scrambling, and the scrambled E bits may be transmitted in the encoded communication 540.

The receiver 510 may receive and/or detect the encoded communication 540. The receiver 510 may decode the encoded communication using a decoder 545. In some examples, the decoder 545 may be a polar decoder, such as when the encoder 535 is a polar encoder. In such examples, an input to the decoder 545 may include an indication of one or more frozen bits 550. A frozen bit may be a bit in an input data sequence (e.g., in the information 515) that is predetermined and known by both the transmitter 505 and the receiver 510. The one or more frozen bits 550 may remain unchanged during the encoding process and may be used as reference points by the decoder 545 for a decoding operation.

The decoder 545 may obtain one or more log likelihood ratios (LLRs) for use in decoding the encoded communication 540. For example, a received signal may be passed through a demodulator and/or RF front end of the receiver 510. The demodulator and/or RF front end may output one or more LLRs for each bit of the received signal. The one or more LLRs may represent a likelihood (or probability) that a given bit is a zero (0) or one (1). The decoder 545 may initialize a list of candidate codewords to be decoded. The decoder 545 may process the LLRs for the received signal by initializing the LLRs for each bit of the candidate codewords based on the received LLRs. The decoder 545 may perform successive cancellation on each bit of the candidate codewords. The decoder 545 may iterate through the bits of each codeword and update the LLRs based on the LLRs of the previously decoded bits and channel characteristics. This successive cancellation process may be repeated until all bits of all codewords in the list are decoded. In some examples, the decoder 545 may identify branching points where the decoder 545 may consider multiple possible values for a bit. At these points, the decoder 545 may split the list into multiple branches, each representing a different possible value for the bit. The decoder 545 may determine (e.g., calculate) a path metric for each branch in the list based on the LLRs and other factors, such as branch length and/or reliability. The path metric may represent the likelihood or probability of each branch being the correct decoding path. The decoder 545 may prune the list of codewords by removing branches with lower path metrics, keeping only a predefined quantity (e.g., L) of branches with the highest path metrics. As shown in FIG. 5, an output of the decoder 545 may be L codewords (e.g., L candidate codewords), each having a length N.

As shown in FIG. 5, the receiver 510 may perform a CRC operation 555 using the L codewords. For each candidate codeword in the L codewords, the receiver 510 may determine (e.g., compute) a CRC code (e.g., a CRC checksum). A CRC code for a given candidate codeword may be determined based on the given candidate codeword using a predetermined CRC polynomial. The CRC computation may include the receiver 510 performing bitwise operations on the codeword bits. The receiver 510 may compare the computed CRC code to a received CRC code that accompanies the received signal. If the computed CRC code matches the received CRC code, then the receiver 510 may determine that the candidate codeword is likely to be error-free. This may be referred to as a passing CRC. Alternatively, if the computed CRC code does not match the received CRC code, this suggests that errors may be present in the candidate codeword. This may be referred to as a failing CRC. Based on the results of the CRC comparison, the receiver 510 selects the candidate codeword(s) with passing CRCs as the decoded communication(s). These selected codewords represent the final decoded output of the decoding process. If multiple codewords pass the CRC, then the receiver 510 may use additional criteria to select the most likely correct codeword, such as the likelihood metric or other decoding metrics. The final selected codeword may be decoded information 560 obtained by the receiver 510.

As described above, a CRC operation can be used to prune (or eliminate) candidate codewords during list-based decoding. However, performing the CRC operation during the decoding (e.g., on-the-fly while performing the list-based decoding or while performing successive cancellation list decoding) may consume processing resources, may result in additional hardware components included in the decoder 545 (e.g., increasing a hardware area occupied by the decoder 545), and/or result in increased decoding cycles (e.g., thereby increasing latency of the decoding operation), among other examples. Therefore, the CRC operation may be performed post-decoding (e.g., on each of the L candidate codewords output by the decoder 545). However, this consumes processing resources, power resources, and/or memory resources, among other examples associated with performing the CRC operation for each of the L candidate codewords output by the decoder 545.

As indicated above, FIG. 5 is provided as an example. Other examples may differ from what is described with regard to FIG. 5.

Figure 6:
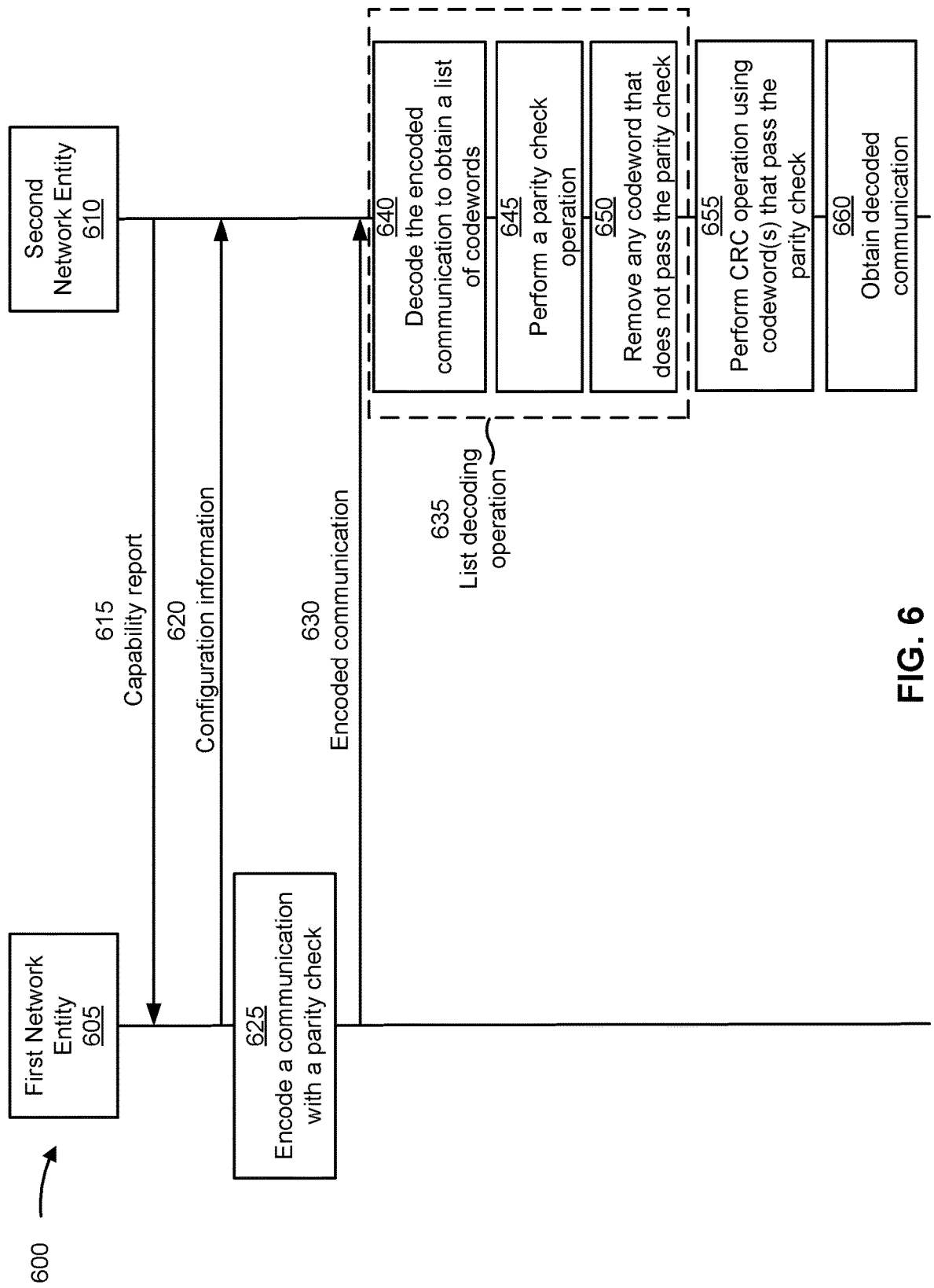
FIG. 6 is a diagram of an example associated with a parity check for list-based decoding, in accordance with the present disclosure.

FIG. 6 is a diagram of an example 600 associated with a parity check for list-based decoding, in accordance with the present disclosure. As shown in FIG. 6, a first network entity 605 may communicate with a second network entity 610. The first network entity 605 may be the network entity 102, the network entity 106, a network node 210, a UE 220, a base station, a CU, a DU, and/or an RU. The second network entity 610 may be the network entity 102, the network entity 106, a network node 210, a UE 220, a base station, a CU, a DU, and/or an RU. In some aspects, the first network entity 605 may be a network node 210 and the second network entity 610 may be a UE 220. In such examples, the encoded communication described herein may be a downlink communication, such as DCI or a broadcast communication. In other aspects, the first network entity 605 may be a UE 220 and the second network entity 610 may be a network node 210. In such examples, the encoded communication described herein may be an uplink communication, such as UCI. In some aspects, the first network entity 605 and the second network entity 610 may be part of a wireless network (e.g., the wireless communication network 200). The first network entity 605 and the second network entity 610 may have established a wireless connection prior to operations shown in FIG. 6.

In some aspects, as shown by reference number 615, the second network entity 610 may transmit, and the first network entity 605 may receive, a capability report (such as when the second network entity 610 is a UE 220). In other aspects, the first network entity 605 may transmit, and the second network entity 610 may receive, the capability report in a similar manner as described herein (such as when the first network entity 605 is a UE 220). The capability report may indicate capability information of the second network entity 610. The second network entity 610 may transmit the capability report via an uplink communication, a UE assistance information (UAI) communication, a UCI communication, an uplink MAC-CE communication, an RRC communication, a PUCCH, and/or a PUSCH, among other examples. The capability report may indicate one or more parameters associated with respective capabilities of the second network entity 610. The one or more parameters may be indicated via respective information elements (IEs) included in the capability report.

The capability report may indicate whether the second network entity 610 supports a feature and/or one or more parameters related to the feature. For example, the capability report may indicate a capability and/or parameter for supporting a parity check as part of a list-based decoding operation. One or more operations described herein may be based on capability information of the capability report. For example, the second network entity 610 may perform a communication in accordance with the capability information, or may receive configuration information that is in accordance with the capability information.

In some aspects, the capability report may indicate whether the second network entity 610 supports performing a parity check operation during decoding using a list-based decoding scheme, such as a polar decoding scheme or another list-based decoding scheme. For example, the capability report may indicate whether the second network entity 610 supports iteratively performing a parity check during a decoding operation, such as for one or more candidate codewords decoded during a list-based decoding operation. In some aspects, the capability report may indicate whether the second network entity 610 supports a list-based decoding scheme that includes respective parity check operations for each list of decoded information of a set of one or more lists of decoded information, as described in more detail elsewhere herein.

As shown by reference number 620, the first network entity 605 may transmit, and the second network entity 610 may receive, configuration information (such as when the first network entity 605 is a network node 210). In other aspects, the second network entity 610 may transmit, and the first network entity 605 may receive, the configuration information in a similar manner as described herein (such as when the second network entity 610 is a network node 210). In some aspects, the second network entity 610 may receive the configuration information via one or more of system information signaling (e.g., a master information block (MIB) and/or a system information block (SIB), among other examples), RRC signaling, MAC signaling (e.g., one or more MAC-CEs), and/or DCI signaling, among other examples.

In some aspects, the configuration information may indicate one or more candidate configurations and/or communication parameters. In some aspects, the one or more candidate configurations and/or communication parameters may be selected, activated, and/or deactivated by a subsequent indication. For example, the subsequent indication may select a candidate configuration and/or communication parameter from the one or more candidate configurations and/or communication parameters. In some aspects, the subsequent indication (e.g., an indication described herein) may include a dynamic indication, such as one or more MAC-CEs and/or one or more DCI messages, among other examples.

In some aspects, the configuration information may indicate that the first network entity 605 and the second network entity 610 are to communicate using a channel coding scheme. The channel coding scheme may include a list-based decoding scheme. For example, the channel coding scheme may include an encoding scheme that outputs encoded information that can be decoded using the list-based decoding scheme. The channel coding scheme may include a polar coding scheme, a list Viterbi coding scheme, a Reed-Muller coding scheme, or another channel coding scheme. In some aspects, the channel coding scheme may include an SCL decoding scheme. In some aspects, the channel coding scheme may be defined, or otherwise fixed, by a wireless communication standard, such as the 3GPP. In some aspects, the channel coding scheme may be defined (e.g., by the wireless communication standard) or configured (e.g., by the first network entity 605) for one or more communication channels. For example, the channel coding scheme (e.g., that includes or supports a list-based decoding scheme) may be defined or configured for one or more control channels (e.g., the PDCCH or the PUCCH), and/or for one or more broadcast channels (e.g., the PBCH), among other examples.

In some aspects, the configuration information may indicate that the channel coding scheme includes a parity check to be performed during decoding. As used herein, "parity check" refers to an operation to enable an entity or device to determine whether a total quantity of bits, in a series of bits, having a given value is even or odd. For example, the parity check may include an entity or device determining whether a quantity of bits having a value of one (1), in a series of bits, is even or odd. The parity check may include even parity or odd parity. For even parity, an entity or device may encode a communication such that the total quantity of bits in the encoded communication having a value of one (1) is an even number. For example, the entity or device may append a parity bit to cause the total quantity of bits in the encoded communication having a value of one (1) to be an even number (e.g., the parity bit may have a value of zero (0) if the encoded communication has an even number of bits having a value of one (1) or the parity bit may have a value of one (1) if the encoded communication has an odd number of bits having a value of one (1)). For odd parity, an entity or device may encode a communication such that the total quantity of bits in the encoded communication having a value of one (1) is an odd number. For example, the entity or device may append a parity bit to cause the total quantity of bits in the encoded communication having a value of one (1) to be an odd number (e.g., the parity bit may have a value of zero (0) if the encoded communication has an odd number of bits having a value of one (1) or the parity bit may have a value of one (1) if the encoded communication has an even number of bits having a value of one (1)). As part of a parity check, an entity or device performing decoding may determine whether a received communication has an even number of bits having a value of one (1) or an odd number of bits having a value of one (1). As an example, if even parity is being used and the received communication has an even number of bits having a value of one (1), then the entity or device may determine that the parity check passes. Alternatively, if the received communication has an odd number of bits having a value of one (1), then the entity or device may determine that the parity check fails and/or that there is an error in the received communication. Therefore, the parity check may be used to detect errors in transmitted or stored communications.

In some aspects, the configuration information may indicate a type of parity check to be used (e.g., even parity or odd parity). In some aspects, the type of parity check to be used may be defined, or otherwise fixed, by a wireless communication standard, such as the 3GPP. In other words, the first network entity 605 and the second network entity 610 may be synchronized on the type of parity check (e.g., either through an over-the-air configuration or via an internal configuration, such as an original equipment manufacturer (OEM) configuration).

In some aspects, the configuration information may indicate a location of a CRC code to be appended to encoded communications. For example, the configuration information may define where and/or how the CRC code (e.g., a CRC checksum) is to be appended to information (e.g., one or more bits) as part of an encoding operation. In other aspects, the location of the CRC code may be indicated in the encoded communication. In other aspects, the location of the CRC code may be defined, or otherwise fixed, by a wireless communication standard. The second network entity 610 may obtain the location of the CRC code. This may enable the second network entity 610 to ignore or remove the CRC code when performing the parity check(s), as described in more detail elsewhere herein (e.g., because the values of bits in the CRC code may not be considered when computing the parity bit at the first network entity 605).

The second network entity 610 may configure itself based at least in part on the configuration information. In some aspects, the second network entity 610 may be configured to perform one or more operations described herein based at least in part on the configuration information.

In some aspects, the configuration information described in connection with reference number 620 and/or the capability report described in connection with reference number 615 may include information transmitted via multiple communications. Additionally, or alternatively, the first network entity 605 may transmit the configuration information, or a communication including at least a portion of the configuration information, before and/or after the second network entity 610 transmits the capability report. For example, the first network entity 605 may transmit a first portion of the configuration information before the second network entity 610 transmits the capability report, the second network entity 610 may transmit at least a portion of the capability report, and the first network entity 605 may transmit a second portion of the configuration information after receiving the capability report.

As shown by reference number 625, the first network entity 605 may encode a communication with a parity check (e.g., with a parity bit). For example, the first network entity 605 may obtain a communication to be transmitted or broadcast. The communication may be a control communication (e.g., DCI or UCI), a data communication, and/or a broadcast communication, among other examples. For example, the communication may be configured to be transmitted via a communication channel for which the channel coding scheme described herein (e.g., that includes the list-based decoding scheme) is applicable. The communication may include one or more bits (e.g., a series of bits, such as information bits). The one or more bits may be referred to as a "payload" of the communication.

The first network entity 605 may encode, using a list-decodable coding scheme, the channel coding scheme that includes a list-based decoding scheme), first information for the communication to obtain an encoded communication. The first information may be the one or more bits of the communication. For example, the first information may be the payload of the communication. The encoded communication may include second information. The second information may include the first information, CRC information (e.g., a CRC code or a CRC checksum), and a parity indication (e.g., a parity bit).

In some aspects, the first network entity 605 may append the parity indication to the first information prior to a CRC operation associated with the CRC information. For example, the first information (e.g., a payload of the communication) may include A bits. The first network entity 605 may determine the number of bits, in the A bits, having a value of one (1). The first network entity 605 may determine a value of the parity indication (e.g., one (1) or zero (0)) based on, in association with, or otherwise using the number of bits, in the A bits, having a value of one (1). For example, the first network entity 605 may use even parity. In such examples, if the number of bits, in the A bits, having a value of one (1) is an even number, then the first network entity 605 may determine that the value of the parity indication (e.g., the parity bit) is zero (0) (e.g., such that the total number of bits having a value of one (1) remains an even number after the parity indication is appended to the payload). Alternatively, if the number of bits, in the A bits, having a value of one (1) is an odd number, then the first network entity 605 may determine that the value of the parity indication (e.g., the parity bit) is one (1) (e.g., such that the total number of bits having a value of one (1) is changed to an even number after the parity indication is appended to the payload). In other examples, odd parity may be used. In such examples, if the number of bits, in the A bits, having a value of one (1) is an odd number, then the first network entity 605 may determine that the value of the parity indication (e.g., the parity bit) is zero (0) (e.g., such that the total number of bits having a value of one (1) remains an odd number after the parity indication is appended to the payload). Alternatively, if the number of bits, in the A bits, having a value of one (1) is an even number, then the first network entity 605 may determine that the value of the parity indication (e.g., the parity bit) is one (1) (e.g., such that the total number of bits having a value of one (1) is changed to an odd number when the parity indication is appended to the payload).

After determining the value of the parity indication (e.g., the parity bit), the first network entity 605 may append, add, or otherwise include the parity indication to the first information (e.g., resulting in A+1 bits). In some aspects, the first network entity 605 may append the parity indication to the end of the first information. In other aspects, the first network entity 605 may append the parity indication to the beginning of the first information. In other aspects, the first network entity 605 may append or otherwise include the parity indication in another location within the first information. In some aspects, the first network entity 605 and the second network entity 610 may be synchronized as to the location of the parity indication within first information (e.g., via an over-the-air indication or via a definition fixed by a wireless communication standard).

After appending the parity indication to the first information, the first network entity 605 may perform a CRC operation using the combined information (e.g., the A+1 bits). For example, the first network entity 605 may perform a CRC operation using the A+1 bits (e.g., the combined first information and parity indication). For example, the CRC operation may include the first network entity 605 determining (e.g., calculating) a CRC code (e.g., a CRC checksum) using the A+1 bits. For example, the CRC operation may include determining (e.g., calculating) a CRC code having a size of C bits, such as 24 bits (e.g., a 24-bit CRC) or another quantity of bits. The CRC code may be appended to the A+1 bits, resulting in K+1 bits (e.g., where K=A+C).

Additionally, the first network entity 605 may perform an RNTI masking operation using the K+1 bits. As an example, an RNTI may be R bits, and MSB R-bits of the C-bit CRC may be masked during the RNTI masking. In other words, the RNTI masking may be applied on the MSB R-bits of the C-bit CRC (e.g., where C is greater than or equal to R). The K bits may include the A+1 bits and the C-bit CRC code. As an example, after the attachment of the C-bit CRC code to the A+1 bits, during the RNTI masking, the CRC code (or CRC parity bits) may be scrambled with the RNTI $x_{rnti,0}$, $x_{rnti,1}, \ldots, x_{rnti,R-1}$, Where $x_{rnti,0}$ corresponds to the MSB of the RNTI, to form the sequence of bits $c_0, c_1, c_2, c_3, \ldots, c_K$.

The first network entity 605 may perform an interleaving operation using an interleaver and the K+1 bits. For example, the first network entity 605 may interleave the second information (e.g., the K+1 bits) to obtain interleaved information. An output of the interleaver may be interleaved K+1 bits (e.g., the interleaved information). The first network entity 605 may perform a mapping operation using a mapper and the interleaved K+1 bits. For example, the mapper May map the interleaved K+1 bits to N bits (e.g., the first network entity 605 may map the K+1 bits to N bits). N may be a code block size of the coding scheme being used to encode the communication (e.g., may be the code block size of the list-decodable coding scheme used by the first network entity 605 and the second network entity 610, as described herein). The first network entity 605 may encode the N bits using an encoder. As an example, the encoder may be a polar encoder or another type of encoder. An output of the encoder may be encoded N bits. The encoded N bits may form an encoded communication. The first network entity 605 may perform additional signal processing for the encoded N bits, such as modulation or other signal processing, prior to transmitting the encoded communication.

As shown by reference number 630, the first network entity 605 may transmit, and the second network entity 610 may receive, the encoded communication. The encoded communication may be transmitted via an over-the-air communication. For example, the first network entity 605 may transmit, and the second network entity 610 may receive, the encoded communication via a communication channel. The communication channel may be a control channel (e.g., the PDCCH or the PUCCH), a broadcast channel (e.g., the PBCH), or another communication channel. In some aspects, the encoded communication may be a control communication, such as a DCI communication, a UCI communication, or a sidelink control information (SCI) communication, among other examples. As another example, the encoded communication may be, or may be included in, a broadcast communication.

The second network entity 610 may decode the encoded communication to obtain a decoded communication. For example, as shown in FIG. 6, and by reference number 635, the second network entity 610 may perform a list decoding operation. The list decoding operation may be a decoding operation associated with determining or obtaining a list of one or more candidate codewords for the list-based decoding operation described herein. As shown in FIG. 6, the list decoding operation may include one or more parity check operations (e.g., during decoding of bits received as part of the encoded communication). For example, the second network entity 610 may decode the encoded communication to obtain a communication (e.g., a decoded communication) via a list-based decoding scheme that includes respective parity check operations for each list of decoded information of a set of one or more lists of decoded information.

For example, as shown by reference number 640, the second network entity 610 may decode the encoded communication to obtain a list of one or more codewords (e.g., candidate codewords). For example, the second network entity 610 may initialize a list of one or more candidate decoding paths (e.g., an initial list of one or more codewords). In some aspects, the initialized list may include a single path representing an all-zero codeword. The list decoding operation may be an iterative process that includes one or more decoding cycles. The second network entity 610 may iteratively decode the encoded communication one bit at a time. At each iteration (e.g., each cycle), the second network entity 610 may consider the next bit to be decoded and may update the list of candidate paths (e.g., the list of candidate codewords). For each candidate path (e.g., each candidate codeword) in the list, the second network entity 610 may duplicate the candidate path and assign one branch to represent the assumption that the next bit has a value (e.g., a bit value) of zero (0) and the other branch to represent the assumption that the next bit has a value (e.g., a bit value) of one (1). After expanding the candidate paths, the second network entity 610 may determine (e.g., calculate) a metric for each new path based on the received signal and the likelihood of each hypothesis (0 or 1) given the received data. The metric may be an LLR of the received encoded communication, or another metric. To limit the growth of the list and manage computational complexity, the second network entity 610 may prune (e.g., remove) paths with low metrics (e.g., metrics having values that do not satisfy a threshold). The second network entity 610 may keep (e.g., store and/or process) only the top L paths (e.g., the top L candidate codewords) in the list.

As shown by reference number 645, during the list decoding operation, the second network entity 610 may perform one or more parity check operations. For example, the second network entity 610 may perform a parity check on each candidate codeword decoded by the second network entity 610 (e.g., decoded by a decoder of the second network entity 610). For example, the second network entity 610 may obtain LLR information associated with the encoded communication. The second network entity 610 may perform, using the LLR information and using the list-based decoding scheme, a decoding operation (e.g., the list decoding operation) to obtain the set of one or more lists, where the decoding operation includes the parity check operation(s). In some aspects, a "list" of decoded information, as used herein, refers to a candidate codeword decoded by the second network entity 610.

Some examples are described herein where the information being encoded uses binary values (e.g., a Galois field order of two). However, the aspects described herein are similarly applicable to other Galois field orders, such as higher order Galois fields. In such examples, a parity parameter may be determined using modulo addition (e.g., $GF(2^q)$ addition, where q is a positive integer). For example, bitwise addition using one or more exclusive or (XOR) operations may be used to determine the parity of a codeword when higher order Galois fields are used.

In some aspects, the second network entity 610 may obtain, for each list of the set of one or more lists, a parity parameter based on a quantity of binary one bits (e.g., bits having a binary value of one (1)) included in that list. The parity parameter may indicate whether the quantity of binary one bits included in a given list (e.g., in a given candidate codeword) is an even value or an odd value. A passing result for a parity check may include the parity parameter matching a parity type for the list-based decoding scheme. For example, a parity parameter May match the parity type if the parity parameter indicates that the quantity of binary one bits included in a given list is the same type of value (e.g., even or odd) as the parity type for the list-based decoding scheme. If the parity parameter indicates that the quantity of binary one bits included in a given list is a different type of value (e.g., even or odd) than the parity type for the list-based decoding scheme, then the second network entity 610 may determine that the parity check for that given candidate codeword has failed. For example, if the parity type is even parity and the parity parameter indicates that a given candidate codeword includes an odd number of binary one bits, then the parity check fails for the given candidate codeword.

In some aspects, the second network entity 610 may generate, for each list of the set of one or more lists, partial parity parameters for respective decoded bits included in that list. A parity parameter for that list may be a partial parity parameter of a last decoded bit included in that list. For example, the second network entity 610 may obtain, via the list-based decoding scheme, a first decoded bit of decoded bits included in that list. The second network entity 610 may generate, based on a first value of the first decoded bit, a first partial parity parameter for that list indicating whether a quantity of binary one bits included in that list is an even value or an odd value. The second network entity 610 may obtain, via the list-based decoding scheme, a second decoded bit of the decoded bits. The second network entity 610 may generate, based on a second value of the second decoded bit and the first partial parity parameter, a second partial parity parameter for that list indicating whether the quantity of binary one bits included in that list is the even value or the odd value. In other words, the second network entity 610 may track or maintain the parity of decoded bits as they are decoded by a decoder (e.g., on the fly). This may reduce latency and/or processing overhead associated with performing the parity check. Once all bits of a given candidate codeword are decoded, the partial parity indication for the last decoded bit may indicate whether the given candidate codeword includes an even quantity of binary one bits or an off quantity of binary one bits. This information can be used to perform the parity check for the entire given candidate codeword.

In some aspects, the second network entity 610 may generate, for each list of the set of one or more lists, partial parity parameters for respective sets of one or more decoded bits included in that list. A parity parameter for that list may be a partial parity parameter of a last set of one or more decoded bits included in that list. For example, the second network entity 610 may decode a first P bits of a given codeword (e.g., where the given codeword includes N bits and N is greater than or equal to P). The second network entity 610 may determine a first partial parity parameter for the first P bits (e.g., based on a quantity of binary one bits included in the first P bits). The second network entity 610 may decode a second P bits in the given codeword. The second network entity 610 may determine a second partial parity parameter for the first P bits based on the first partial parity parameter and based on a quantity of binary one bits included in the second P bits. The second network entity 610 may continue this process until all N bits of the given codeword are decoded and a parity parameter is determined for the entire given candidate codeword.

In some aspects, the second network entity 610 may obtain an indication of a location of CRC information in the encoded communication (e.g., a location of a CRC code, a CRC checksum, or CRC bits included in the encoded communication). The second network entity 610 may exclude or ignore the CRC information as part of the parity check operations. In other words, the second network entity 610 may not include the CRC information (e.g., bits included in the CRC information) when determining whether a quantity of bits in the encoded communication is an even value or an odd value (e.g., because the parity indication or parity bit may have been added by the first network entity 605 prior to performing a CRC operation). In some aspects, the location of CRC information in the encoded communication may be an input to a decoder (e.g., a decoder component) of the second network entity 610 (e.g., in addition to a frozen bit location, as described elsewhere herein).

As shown by reference number 650, the second network entity 610 may remove any candidate codeword (e.g., from a list of candidate codewords) that does not pass the parity check (e.g., that fails the parity check). The second network entity 610 may discard any lists, from the set of one or more lists, that are associated with a failing result for the parity check operations. For example, the parity check may be used to detect codewords that have a high likelihood of having an error. Therefore, the parity check can be used to prune or remove candidate codewords during the decoding process (e.g., while the one or more candidate codewords are being decoded). For example, by exploiting the successive decoding nature of list-based decoding (e.g., of an SCL polar decoder), the second network entity 610 may determine parity for information bits in candidate codewords incrementally while decoding.

This may reduce the quantity of candidate codewords output by a decoder of the second network entity 610 without significantly increasing hardware overhead and/or without increasing a quantity of decoding cycles used to decode the one or more candidate codewords. For example, by using the parity check(s) during decoding as described herein, the quantity of lists (e.g., of candidate codewords) output by the decoder may be reduced by 40% or more. The lists (e.g., of candidate codewords) pruned (e.g., removed) during the decoding operation (e.g., the list decoding operation) may be candidate codewords that would have otherwise passed one or more metrics (e.g., LLR metrics or other metrics) and/or that would have otherwise gone additional processing to obtain a decoded communication. Therefore, by using the parity check(s) during decoding as described herein, the second network entity 610 may conserve processing resources, power resources, and/or memory resources, among other examples, that would have otherwise been associated with performing additional processing on candidate codewords that are not valid representations of the communication. Additionally, by using the parity check(s) during decoding as described herein, the second network entity 610 may reduce the latency of the decoding processing by reducing the quantity of codewords for which the additional processing is performed.

For example, the additional processing may include performing a CRC operation and/or other metric computation operations on the one or more candidate codewords. For example, as shown by reference number 655, the second network entity 610 may perform a CRC operation using one or more codewords (e.g., one or more candidate codewords) that pass the parity check (e.g., that are output by a decoder of the second network entity 610). In some aspects, the additional processing may include performing payload bit extraction. For example, the second network entity 610 may determine a given candidate codeword that has a highest likelihood (e.g., based on one or more metrics, such as LLR, energy, symbol error rate, L1 norm, and/or another metric) of representing the communication. The second network entity 610 may extract the information for the communication (e.g., the A bits) from the given candidate codeword that has a highest likelihood of representing the communication.

As shown by reference number 660, the second network entity 610 may obtain the decoded communication (e.g., A bits from the selected codeword). For example, the decoded communication may include information bits (e.g., A bits) that represent (or are the same as) the A bits encoded by the first network entity 605 (e.g., if the decoding operation is successful). In some aspects, the second network entity 610 may perform one or more operations based on, or in response to, obtaining the decoded communication. For example, the information (e.g., A bits) in the decoded communication may instruct the second network entity 610 to perform the one or more operations. In some aspects, the decoded communication may schedule one or more communications (e.g., data communications), may trigger one or more operations, and/or may cause the second network entity 610 to perform another operation.

As indicated above, FIG. 6 is provided as an example. Other examples may differ from what is described with regard to FIG. 6.

Figure 7:
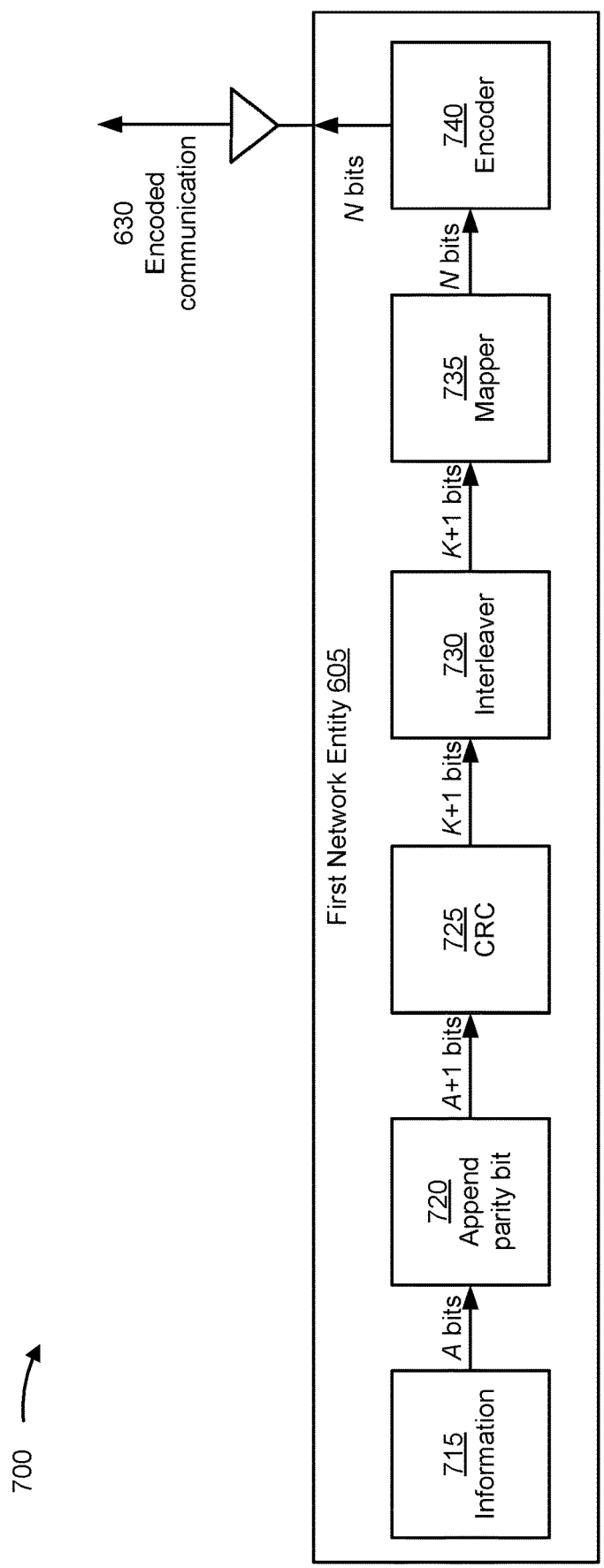
FIG. 7 is a diagram of an example associated with an encoding operation associated with a parity check for list-based decoding, in accordance with the present disclosure.

FIG. 7 is a diagram of an example 700 associated with an encoding operation associated with a parity check for list-based decoding, in accordance with the present disclosure. As shown in FIG. 7, the first network entity 605 may perform one or more operations to encode a communication. For example, the operations described and/or depicted in FIG. 7 may be performed by the first network entity 605, such as described in connection with reference number 625.

As shown in FIG. 7, the first network entity 605 may have information 715 to be transmitted via a communication channel. The information 715 may include control information (e.g., DCI or UCI) or other information. As described herein, the information 715 may be encoded using a channel coding scheme that enables list-based decoding. As shown in FIG. 7, the information 715 may include A bits (e.g., A information bits).

As shown by reference number 720, the first network entity 605 may append a parity bit to the information 715. For example, the first network entity 605 may determine whether the information 715 includes an even quantity or an odd quantity of binary one bits. The first network entity 605 may determine a value of a parity bit based on the quantity of binary one bits and based on a type of parity (e.g., even parity or odd parity) being used, as described in more detail elsewhere herein. The first network entity 605 may append the parity bit to the information 715, resulting in A+1 bits.

The first network entity 605 may perform one or more processing operations to encode and transmit the A+1 bits. For example, the first network entity 605 may perform a CRC operation 725 using the A+1 bits. For example, the CRC operation 725 may include the first network entity 605 determining (e.g., calculating) the CRC code using the A+1 bits. For example, the CRC operation 725 may include determining (e.g., calculating) a CRC code having a size of C bits, such as 24 bits (e.g., a 24-bit CRC) or another quantity of bits. The CRC code may be appended to the information 515, resulting in K+1 bits (e.g., where K=A+C).

The first network entity 605 may perform an interleaving operation using an interleaver 730 and the K+1 bits. An output of the interleaver 730 may be interleaved K+1 bits. The first network entity 605 may perform a mapping operation using a mapper 735 and the interleaved K+1 bits. For example, the mapper 735 may map the interleaved K+1 bits to N bits. N may be a code block size of the coding scheme being used to encode the information 715. The first network entity 605 may encode the N bits using an encoder 740. As an example, the encoder 740 may be a polar encoder or another type of encoder. An output of the encoder 740 may be encoded N bits. The encoded N bits may form an encoded communication (e.g., transmitted as described in connection with reference number 630). In some examples, prior to transmitting the encoded communication, the first network entity 605 may perform a sub-block interleaving operation and/or a rate matching operation using the N bits, which may result in E bits. The E bits may undergo a scrambling, and scrambled E bits may be transmitted in the encoded communication.

As indicated above, FIG. 7 is provided as an example. Other examples may differ from what is described with regard to FIG. 7.

Figure 8:
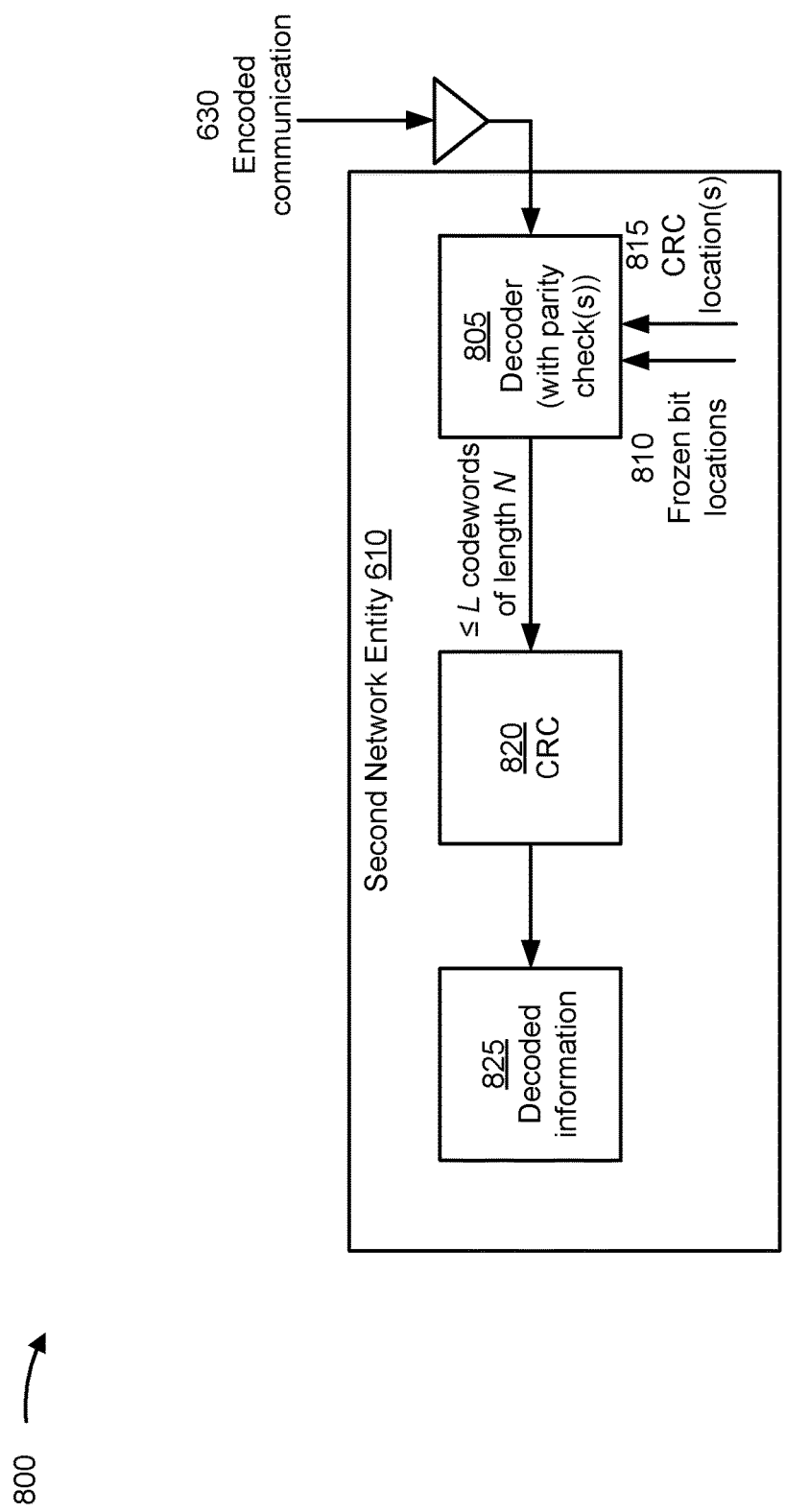
FIG. 8 is a diagram of an example associated with a decoding operation associated with a parity check for list-based decoding, in accordance with the present disclosure.

FIG. 8 is a diagram of an example 800 associated with a decoding operation associated with a parity check for list-based decoding, in accordance with the present disclosure. As shown in FIG. 8, the second network entity 610 may perform one or more operations to decode an encoded communication. For example, the operations described and/or depicted in FIG. 8 may be performed by the second network entity 610, such as described in connection with reference number 635, reference number 640, reference number 645, reference number 650, reference number 655, and/or reference number 660.

As shown in FIG. 8, the second network entity 610 may receive and/or detect the encoded communication (such as described in connection with reference number 630). The second network entity 610 may decode the encoded communication using a decoder 805. In some examples, the decoder 805 may be a polar decoder. In such examples, an input to the decoder 805 may include an indication of one or more frozen bits 810. A frozen bit may be a bit in an input data sequence (e.g., in the information 715) that is predetermined and known by both the first network entity 605 and the second network entity 610. The one or more frozen bits 810 may remain unchanged during the encoding process and may be used as reference points by the decoder 805 for a decoding operation.

Additionally, an input to the decoder 805 may include one or more CRC locations 815. The one or more CRC locations 815 may indicate a location, in the encoded communication, of CRC information (e.g., CRC code or a CRC checksum). The decoder 805 may use the one or more CRC locations 815 to exclude CRC information when performing parity check(s) of candidate codewords during decoding of the encoded communication.

The decoder 805 may obtain one or more LLRs for use in decoding the encoded communication. For example, a received signal may be passed through a demodulator and/or RF front end of the second network entity 610. The demodulator and/or RF front end may output one or more LLRs for each bit of the received signal. The one or more LLRs may represent a likelihood (or probability) that a given bit is a zero (0) or one (1). The decoder 805 may initialize a list of candidate codewords to be decoded. The decoder 805 may process the LLRs for the received signal by initializing the LLRs for each bit of the candidate codewords based on the received LLRs. The decoder 805 may perform successive cancellation on each bit of the candidate codewords. The decoder 805 may iterate through the bits of each codeword and update the LLRs based on the LLRs of the previously decoded bits and channel characteristics. This successive cancellation process may be repeated until all bits of all codewords in the list are decoded.

During the successive cancellation process, the decoder 805 may determine a parity for each list of decoded information (e.g., for each decoded candidate codeword). As described in more detail elsewhere herein, the decoder 805 may use the parity checks to remove (e.g., prune) lists and/or candidate codewords during the decoding operation. For example, if a given candidate codeword fails the parity check, then the decoder 805 may refrain from including the given candidate codeword in an output.

In some examples, the decoder 805 may identify branching points where the decoder 545 may consider multiple possible values for a bit. At these points, the decoder 805 may split the list into multiple branches, each representing a different possible value for the bit. The decoder 805 may determine (e.g., calculate) a path metric for each branch in the list based on the LLRs and other factors, such as branch length and/or reliability. The path metric may represent the likelihood or probability of each branch being the correct decoding path. The decoder 805 may prune the list of codewords by removing branches with lower path metrics, keeping only a predefined quantity (e.g., L) of branches with the highest path metrics. Additionally, the decoder 805 may remove any branch (e.g., list or candidate codeword) that fails the parity check. As a result, an output of the decoder 805 may be less than or equal to L codewords, each having a length N. For example, the parity check(s) may enable the decoder 805 to prune (e.g., remove) one or more candidate codewords before additional processing is performed using the one or more candidate codewords.

As shown in FIG. 8, the second network entity 610 may perform a CRC operation 820 using the less than or equal to L codewords. For each candidate codeword in the less than or equal to L codewords, the second network entity 610 may determine (e.g., compute) a CRC code (e.g., a CRC checksum). A CRC code for a given candidate codeword may be determined based on the given candidate codeword using a predetermined CRC polynomial. The CRC computation may include the second network entity 610 performing bitwise operations on the codeword bits. The second network entity 610 may compare the computed CRC code to a received CRC code that accompanies the received signal. If the computed CRC code matches the received CRC code, then the second network entity 610 may determine that the candidate codeword is likely to be error-free. Alternatively, if the computed CRC code does not match the received CRC code, this suggests that errors may be present in the candidate codeword. Based on the results of the CRC comparison, the second network entity 610 selects the candidate codeword(s) with passing CRCs as the decoded communication(s). These selected codewords represent the final decoded output of the decoding process. If multiple codewords pass the CRC, then the second network entity 610 may use additional criteria to select the most likely correct codeword, such as the likelihood metric or other decoding metrics. The final selected codeword may be decoded information 825 obtained by the second network entity 610. For example, by performing the parity check(s) described herein, the second network entity 610 may reduce an amount of processing performed (such as performed in connection with the CRC operation 820) to decode the encoded communication.

As indicated above, FIG. 8 is provided as an example. Other examples may differ from what is described with regard to FIG. 8.

Figure 9:
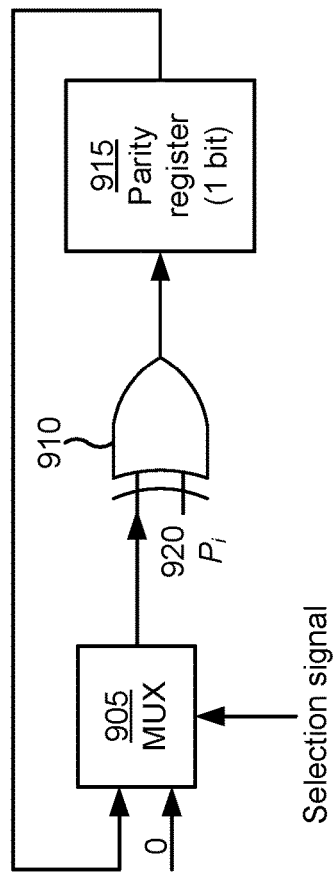
FIG. 9 is a diagram of an example associated with a parity check operation, in accordance with the present disclosure.

FIG. 9 is a diagram of an example 900 associated with a parity check operation, in accordance with the present disclosure. For example, the components and/or operations depicted and described in connection with FIG. 9 may be included in the second network entity 610 (and/or in a component of the second network entity 610, such as the decoder 805).

As shown in FIG. 9, a multiplexer (MUX) 905, an exclusive or (XOR) gate 910, and a parity register 915 may be used to perform the parity check operation. The parity register 915 may be memory used to store and/or maintain a parity parameter for a communication being decoded. In some aspects, the parity register 915 may include one bit indicating whether a current quantity of binary one bits that have been decoded is an even value or an odd value.

As shown in FIG. 9, an input to the MUX 905 may include a current value being stored in the parity register 915 and a value of 0. A selection signal may be provided to the MUX 905 to control or define the output of the MUX 905. An output of the MUX 905 may be provided as an input to the XOR gate 910. Additionally, a bit 920 that has been decoded (shown as $P_i$) may be provided as an input to the XOR gate 910. The bit 920 may be an $i^{th}$ bit decoded by a decoder. An output of the XOR gate 910 may indicate whether a quantity of binary one bits that have been decoded is an even value or an odd value (e.g., based on the previous quantity of binary one bits and the bit 920). The parity check operation may continue in a similar manner until all bits of an encoded communication have been decoded and provided to the XOR gate 910. After all bits of an encoded communication have been decoded, the value stored in the parity register 915 may indicate a parity parameter for a decoded communication (e.g., for a candidate codeword, as described in more detail elsewhere herein).

As indicated above, FIG. 9 is provided as an example. Other examples may differ from what is described with regard to FIG. 9.

Figure 10:
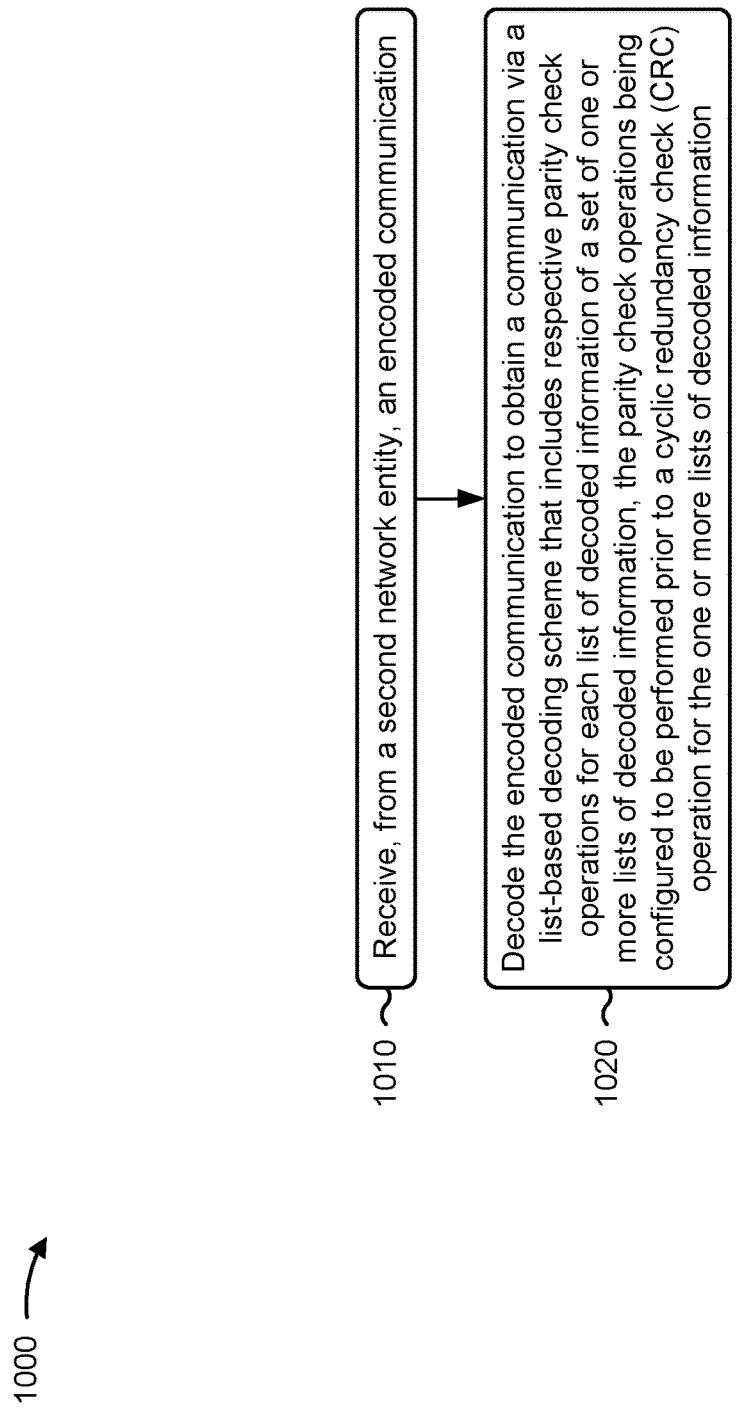
FIG. 10 is a diagram illustrating an example process performed, for example, at a first network entity or an apparatus of a first network entity, in accordance with the present disclosure.

FIG. 10 is a diagram illustrating an example process 1000 performed, for example, at a first network entity or an apparatus of a first network entity, in accordance with the present disclosure. Example process 1000 is an example where the apparatus or the first network entity (e.g., the second network entity 610, the network entity 102, the network entity 106, a network node 210, a UE 220, a base station, a CU, a DU, and/or an RU) performs operations associated with a parity check for list-based decoding.

As shown in FIG. 10, in some aspects, process 1000 may include receiving, from a second network entity, an encoded communication (block 1010). For example, the first network entity (e.g., using reception component 1202 and/or communication manager 1306, depicted in FIG. 12) may receive, from a second network entity, an encoded communication, as described above.

As further shown in FIG. 10, in some aspects, process 1000 may include decoding the encoded communication to obtain a communication via a list-based decoding scheme that includes respective parity check operations for each list of decoded information of a set of one or more lists of decoded information, the parity check operations being configured to be performed prior to a CRC operation for the one or more lists of decoded information (block 1020). For example, the first network entity (e.g., using communication manager 1306, depicted in FIG. 12) may decode the encoded communication to obtain a communication via a list-based decoding scheme that includes respective parity check operations for each list of decoded information of a set of one or more lists of decoded information, the parity check operations being configured to be performed prior to a CRC operation for the one or more lists of decoded information, as described above.

Process 1000 may include additional aspects, such as any single aspect or any combination of aspects described below and/or in connection with one or more other processes described elsewhere herein.

In a first aspect, decoding the encoded communication includes obtaining LLR information associated with the encoded communication; performing, using the LLR information and using the list-based decoding scheme, a decoding operation to obtain the set of one or more lists, wherein the decoding operation includes the parity check operations; and performing the CRC operation using one or more lists of decoded information, from the set of one or more lists, that have a passing result for the parity check operations.

In a second aspect, alone or in combination with the first aspect, performing the decoding operation includes obtaining, for each list of the set of one or more lists, a parity parameter based on a quantity of binary one bits included in that list, wherein the parity parameter indicates whether the quantity of binary one bits is an even value or an odd value, and wherein the passing result is associated with the parity parameter matching a parity type for the list-based decoding scheme.

In a third aspect, alone or in combination with one or more of the first and second aspects, the parity type is even parity or odd parity.

In a fourth aspect, alone or in combination with one or more of the first through third aspects, performing the decoding operation includes discarding any lists, from the set of one or more lists, that are associated with a failing result for the parity check operations.

In a fifth aspect, alone or in combination with one or more of the first through fourth aspects, performing the decoding operation includes generating, for each list of the set of one or more lists, partial parity parameters for respective decoded bits included in that list, wherein a parity parameter for that list is a partial parity parameter of a last decoded bit included in that list.

In a sixth aspect, alone or in combination with one or more of the first through fifth aspects, generating the partial parity parameters includes obtaining, via the list-based decoding scheme, a first decoded bit of decoded bits included in that list; generating, based on a first value of the first decoded bit, a first partial parity parameter for that list indicating whether a quantity of binary one bits included in that list is an even value or an odd value; obtaining, via the list-based decoding scheme, a second decoded bit of the decoded bits; and generating, based on a second value of the second decoded bit and the first partial parity parameter, a second partial parity parameter for that list indicating whether the quantity of binary one bits included in that list is the even value or the odd value.

In a seventh aspect, alone or in combination with one or more of the first through sixth aspects, performing the decoding operation includes generating, for each list of the set of one or more lists, partial parity parameters for respective sets of one or more decoded bits included in that list, wherein a parity parameter for that list is a partial parity parameter of a last set of one or more decoded bits included in that list.

In an eighth aspect, alone or in combination with one or more of the first through seventh aspects, process 1000 includes obtaining an indication of a location of CRC information in the encoded communication, and excluding the CRC information as part of the parity check operations.

In a ninth aspect, alone or in combination with one or more of the first through eighth aspects, the list-based decoding scheme is a successive cancellation list decoding scheme.

In a tenth aspect, alone or in combination with one or more of the first through ninth aspects, the list-based decoding scheme is a polar coding scheme.

In an eleventh aspect, alone or in combination with one or more of the first through tenth aspects, the parity check operations are associated with an even parity check or an odd parity check.

In a twelfth aspect, alone or in combination with one or more of the first through eleventh aspects, the communication is a control channel communication.

In a thirteenth aspect, alone or in combination with one or more of the first through twelfth aspects, the communication is a broadcast channel communication.

In a fourteenth aspect, alone or in combination with one or more of the first through thirteenth aspects, the communication is a downlink control information communication or an uplink control information communication.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
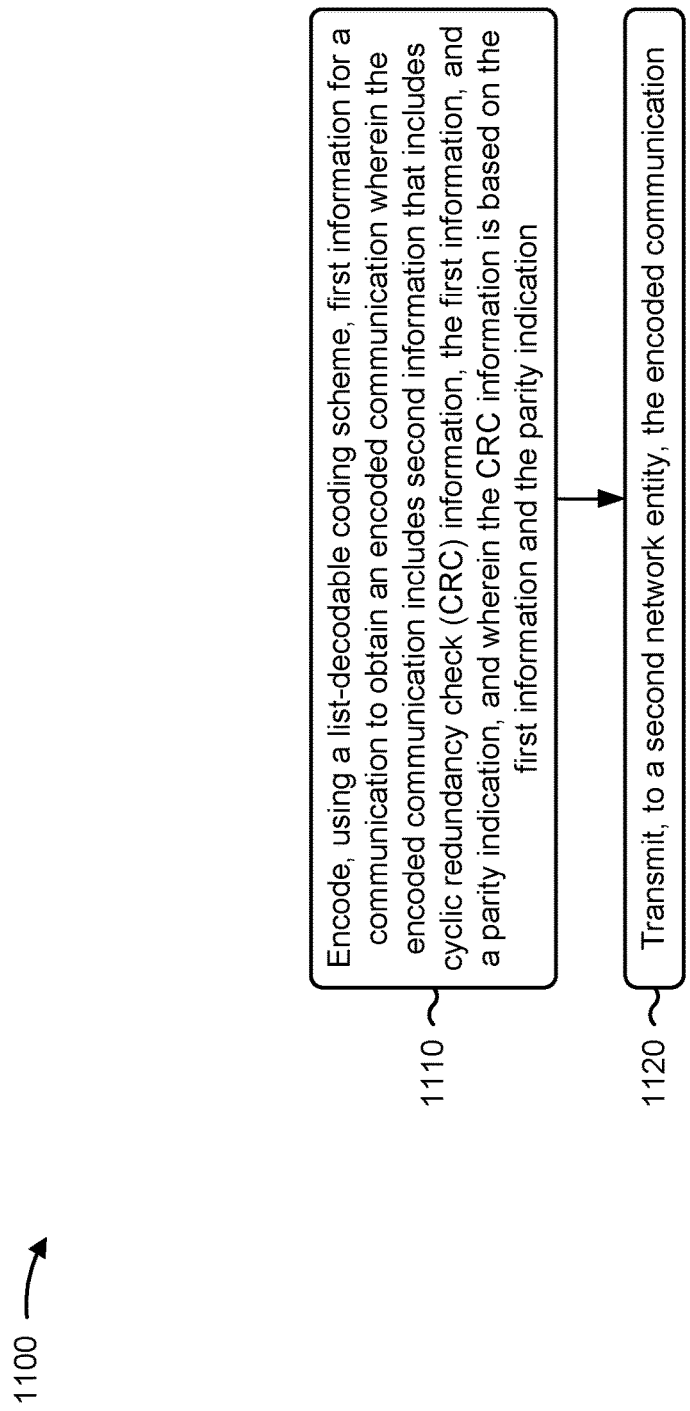
FIG. 11 is a diagram illustrating an example process performed, for example, at a first network entity or an apparatus of a first network entity, in accordance with the present disclosure.

FIG. 11 is a diagram illustrating an example process 1100 performed, for example, at a first network entity or an apparatus of a first network entity, in accordance with the present disclosure. Example process 1000 is an example where the apparatus or the first network entity (e.g., the first network entity 605, the network entity 102, the network entity 106, a network node 210, a UE 220, a base station, a CU, a DU, and/or an RU) performs operations associated with a parity check for list-based decoding.

As shown in FIG. 11, in some aspects, process 1100 may include encoding, using a list-decodable coding scheme, first information for a communication to obtain an encoded communication, wherein the encoded communication includes second information that includes CRC information, the first information, and a parity indication, and wherein the CRC information is based on the first information and the parity indication (block 1110). For example, the first network entity (e.g., using communication manager 1306, depicted in FIG. 13) may encode, using a list-decodable coding scheme, first information for a communication to obtain an encoded communication, wherein the encoded communication includes second information that includes CRC information, the first information, and a parity indication, and wherein the CRC information is based on the first information and the parity indication, as described above. In some aspects, the encoded communication includes second information that includes CRC information, the first information, and a parity indication. In some aspects, the CRC information is based on the first information and the parity indication.

As further shown in FIG. 11, in some aspects, process 1100 may include transmitting, to a second network entity, the encoded communication (block 1120). For example, the first network entity (e.g., using transmission component 1304 and/or communication manager 1306, depicted in FIG. 13) may transmit, to a second network entity, the encoded communication, as described above.

Process 1100 may include additional aspects, such as any single aspect or any combination of aspects described below and/or in connection with one or more other processes described elsewhere herein.

In a first aspect, encoding the first information includes appending the parity indication to the first information prior to a CRC operation associated with the CRC information.

In a second aspect, alone or in combination with the first aspect, encoding the first information includes interleaving the second information to obtain interleaved information, and encoding, using the list-decodable coding scheme, the interleaved information to obtain the encoded communication.

In a third aspect, alone or in combination with one or more of the first and second aspects, the parity indication is associated with even parity or odd parity.

In a fourth aspect, alone or in combination with one or more of the first through third aspects, the list-decodable coding scheme is a polar coding scheme.

In a fifth aspect, alone or in combination with one or more of the first through fourth aspects, the communication is a control channel communication.

In a sixth aspect, alone or in combination with one or more of the first through fifth aspects, the communication is a broadcast channel communication.

In a seventh aspect, alone or in combination with one or more of the first through sixth aspects, the communication is a downlink control information communication or an uplink control information communication.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
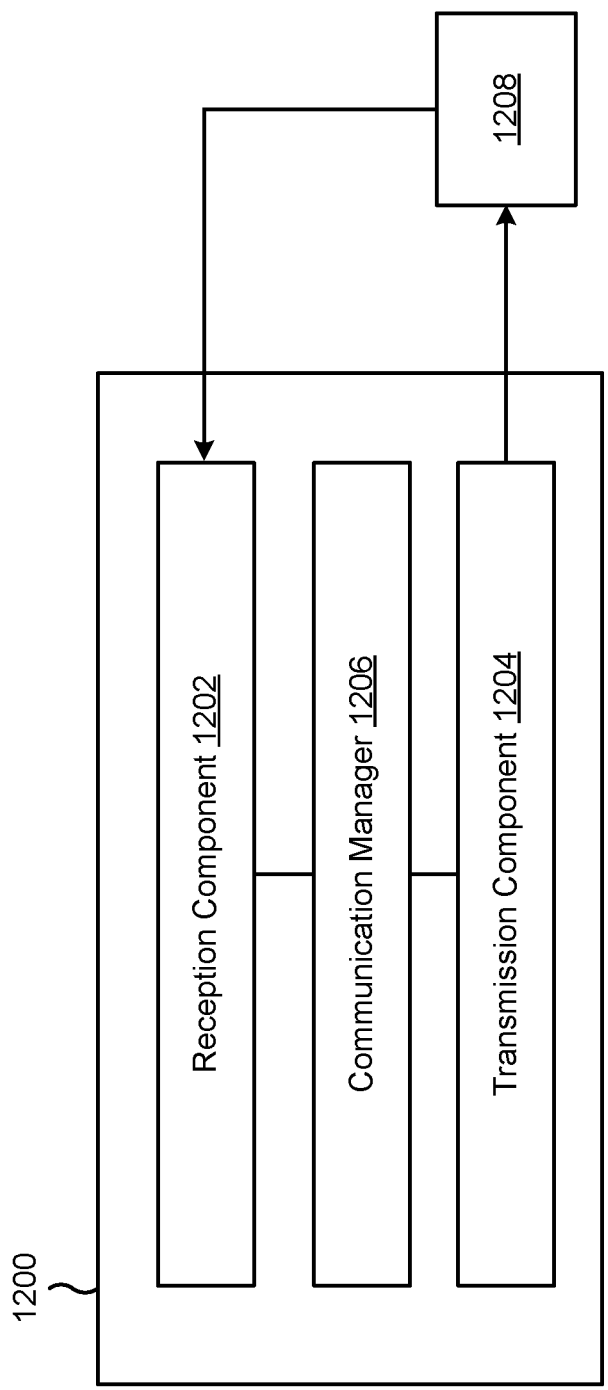
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a network entity, or a network entity may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 114 or the communication manager 118 described in connection with FIG. 1 and/or the communication manager 240 or the communication manager 250 described in connection with FIG. 2. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 6-9. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the UE or the network node described in connection with FIG. 3. Additionally, or alternatively, one or more components shown in FIG. 12 may be implemented within one or more components described in connection with FIG. 3. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, one or more modems, one or more demodulators, one or more MIMO detectors, one or more receive processors, one or more controllers/processors, one or more memories, or a combination thereof, of the UE or the network node described in connection with FIG. 3.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, one or more modems, one or more modulators, one or more transmit MIMO processors, one or more transmit processors, one or more controllers/processors, one or more memories, or a combination thereof, of the UE or the network node described in connection with FIG. 3. In some aspects, the transmission component 1204 may be co-located with the reception component 1202 in one or more transceivers.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The reception component 1202 may receive, from the apparatus 1208 (e.g., a network entity), an encoded communication. The communication manager 1206 may decode the encoded communication to obtain a communication via a list-based decoding scheme that includes respective parity check operations for each list of decoded information of a set of one or more lists of decoded information, the parity check operations being configured to be performed prior to a CRC operation for the one or more lists of decoded information.

The reception component 1202 may obtain an indication of a location of CRC information in the encoded communication.

The communication manager 1206 may comprise excluding the CRC information as part of the parity check operations.

The quantity and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
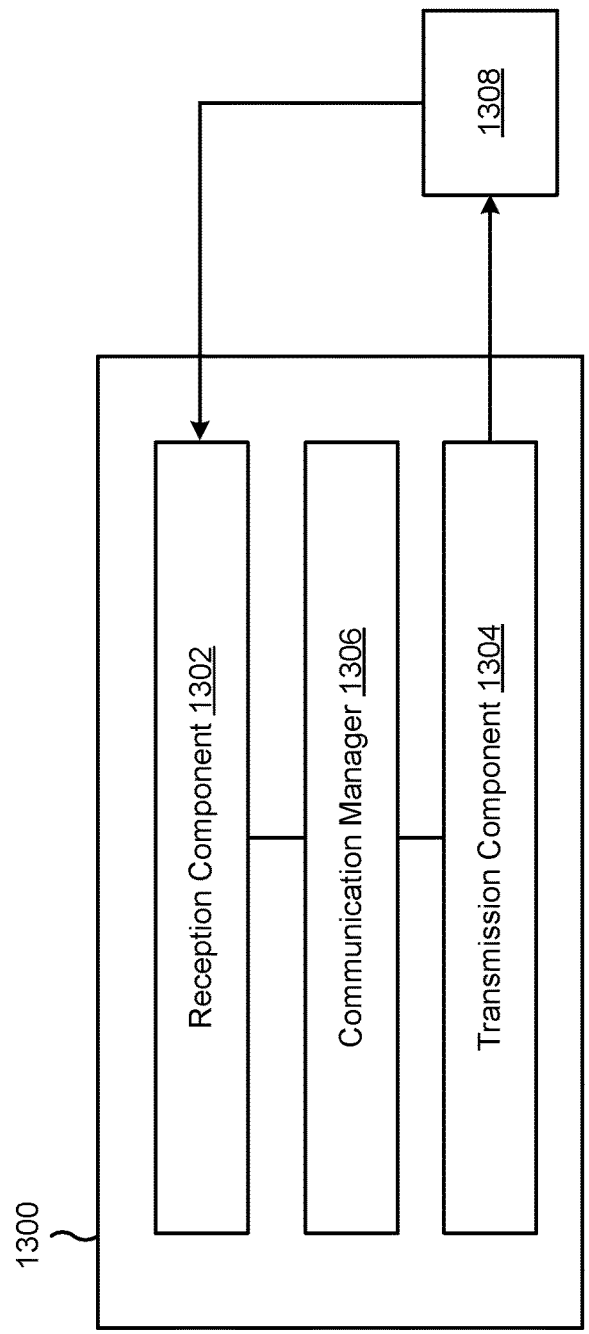
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a network entity, or a network entity may include the apparatus 1300. In some aspects, the apparatus 1300 includes a reception component 1302, a transmission component 1304, and/or a communication manager 1306, which may be in communication with one another (for example, via one or more buses and/or one or more other components). In some aspects, the communication manager 1306 is the communication manager 114 or the communication manager 118 described in connection with FIG. 1 and/or the communication manager 240 or the communication manager 250 described in connection with FIG. 2. As shown, the apparatus 1300 may communicate with another apparatus 1308, such as a UE or a network node (such as a CU, a DU, an RU, or a base station), using the reception component 1302 and the transmission component 1304.

In some aspects, the apparatus 1300 may be configured to perform one or more operations described herein in connection with FIGS. 6-9. Additionally, or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the UE or the network node described in connection with FIG. 3. Additionally, or alternatively, one or more components shown in FIG. 13 may be implemented within one or more components described in connection with FIG. 3. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1302 may receive communications, such as reference signals, control information, data communications, or a combination thereof, from the apparatus 1308. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, one or more modems, one or more demodulators, one or more MIMO detectors, one or more receive processors, one or more controllers/processors, one or more memories, or a combination thereof, of the UE or the network node described in connection with FIG. 3.

The transmission component 1304 may transmit communications, such as reference signals, control information, data communications, or a combination thereof, to the apparatus 1308. In some aspects, one or more other components of the apparatus 1300 may generate communications and may provide the generated communications to the transmission component 1304 for transmission to the apparatus 1308. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1304 may include one or more antennas, one or more modems, one or more modulators, one or more transmit MIMO processors, one or more transmit processors, one or more controllers/processors, one or more memories, or a combination thereof, of the UE or the network node described in connection with FIG. 3. In some aspects, the transmission component 1304 may be co-located with the reception component 1302 in one or more transceivers.

The communication manager 1306 may support operations of the reception component 1302 and/or the transmission component 1304. For example, the communication manager 1306 may receive information associated with configuring reception of communications by the reception component 1302 and/or transmission of communications by the transmission component 1304. Additionally, or alternatively, the communication manager 1306 may generate and/or provide control information to the reception component 1302 and/or the transmission component 1304 to control reception and/or transmission of communications.

The communication manager 1306 may encode, using a list-decodable coding scheme, first information for a communication to obtain an encoded communication, wherein the encoded communication includes second information that includes CRC information, the first information, and a parity indication, and wherein the CRC information is based on the first information and the parity indication. The transmission component 1304 may transmit, to the apparatus 1308 (e.g., a network entity), the encoded communication.

The quantity and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a first network entity, comprising: receiving, from a second network entity, an encoded communication; and decoding the encoded communication to obtain a communication via a list-based decoding scheme that includes respective parity check operations for each list of decoded information of a set of one or more lists of decoded information, the parity check operations being configured to be performed prior to a cyclic redundancy check (CRC) operation for the one or more lists of decoded information.

Aspect 2: The method of Aspect 1, wherein decoding the encoded communication comprises: obtaining log likelihood ratio (LLR) information associated with the encoded communication; performing, using the LLR information and using the list-based decoding scheme, a decoding operation to obtain the set of one or more lists, wherein the decoding operation includes the parity check operations; and performing the CRC operation using one or more lists of decoded information, from the set of one or more lists, that have a passing result for the parity check operations.

Aspect 3: The method of Aspect 2, wherein performing the decoding operation comprises: obtaining, for each list of the set of one or more lists, a parity parameter based on a quantity of binary one bits included in that list, wherein the parity parameter indicates whether the quantity of binary one bits is an even value or an odd value, and wherein the passing result is associated with the parity parameter matching a parity type for the list-based decoding scheme.

Aspect 4: The method of Aspect 3, wherein the parity type is even parity or odd parity.

Aspect 5: The method of any of Aspects 2-4, wherein performing the decoding operation comprises: discarding any lists, from the set of one or more lists, that are associated with a failing result for the parity check operations.

Aspect 6: The method of any of Aspects 2-5, wherein performing the decoding operation comprises: generating, for each list of the set of one or more lists, partial parity parameters for respective decoded bits included in that list, wherein a parity parameter for that list is a partial parity parameter of a last decoded bit included in that list.

Aspect 7: The method of Aspect 6, wherein generating the partial parity parameters comprises: obtaining, via the list-based decoding scheme, a first decoded bit of decoded bits included in that list; generating, based on a first value of the first decoded bit, a first partial parity parameter for that list indicating whether a quantity of binary one bits included in that list is an even value or an odd value; obtaining, via the list-based decoding scheme, a second decoded bit of the decoded bits; and generating, based on a second value of the second decoded bit and the first partial parity parameter, a second partial parity parameter for that list indicating whether the quantity of binary one bits included in that list is the even value or the odd value.

Aspect 8: The method of any of Aspects 2-7, wherein performing the decoding operation comprises: generating, for each list of the set of one or more lists, partial parity parameters for respective sets of one or more decoded bits included in that list, wherein a parity parameter for that list is a partial parity parameter of a last set of one or more decoded bits included in that list.

Aspect 9: The method of any of Aspects 2-8, further comprising: obtaining an indication of a location of CRC information in the encoded communication, and comprising: excluding the CRC information as part of the parity check operations.

Aspect 10: The method of any of Aspects 1-9, wherein the list-based decoding scheme is a successive cancellation list decoding scheme.

Aspect 11: The method of any of Aspects 1-10, wherein the list-based decoding scheme is a polar coding scheme.

Aspect 12: The method of any of Aspects 1-11, wherein the parity check operations are associated with an even parity check or an odd parity check.

Aspect 13: The method of any of Aspects 1-12, wherein the communication is a control channel communication.

Aspect 14: The method of any of Aspects 1-13, wherein the communication is a broadcast channel communication.

Aspect 15: The method of any of Aspects 1-14, wherein the communication is a downlink control information communication or an uplink control information communication.

Aspect 16: A method of wireless communication performed by a first network entity, comprising: encoding, using a list-decodable coding scheme, first information for a communication to obtain an encoded communication, wherein the encoded communication includes second information that includes cyclic redundancy check (CRC) information, the first information, and a parity indication, and wherein the CRC information is based on the first information and the parity indication; and transmitting, to a second network entity, the encoded communication.

Aspect 17: The method of Aspect 16, wherein encoding the first information comprises: appending the parity indication to the first information prior to a CRC operation associated with the CRC information.

Aspect 18: The method of any of Aspects 16-17, wherein encoding the first information comprises: interleaving the second information to obtain interleaved information; and encoding, using the list-decodable coding scheme, the interleaved information to obtain the encoded communication.

Aspect 19: The method of any of Aspects 16-18, wherein the parity indication is associated with even parity or odd parity.

Aspect 20: The method of any of Aspects 16-19, wherein the list-decodable coding scheme is a polar coding scheme.

Aspect 21: The method of any of Aspects 16-20, wherein the communication is a control channel communication.

Aspect 22: The method of any of Aspects 16-21, wherein the communication is a broadcast channel communication.

Aspect 23: The method of any of Aspects 16-22, wherein the communication is a downlink control information communication or an uplink control information communication.

Aspect 24: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-23.

Aspect 25: An apparatus for wireless communication at a device, the apparatus comprising one or more memories and one or more processors coupled to the one or more memories, the one or more processors configured to cause the device to perform the method of one or more of Aspects 1-23.

Aspect 26: An apparatus for wireless communication, the apparatus comprising at least one means for performing the method of one or more of Aspects 1-23.

Aspect 27: A non-transitory computer-readable medium storing code for wireless communication, the code comprising instructions executable by one or more processors to perform the method of one or more of Aspects 1-23.

Aspect 28: A non-transitory computer-readable medium storing a set of instructions for wireless communication, the set of instructions comprising one or more instructions that, when executed by one or more processors of a device, cause the device to perform the method of one or more of Aspects 1-23.

Aspect 29: A device for wireless communication, the device comprising a processing system that includes one or more processors and one or more memories coupled with the one or more processors, the processing system configured to cause the device to perform the method of one or more of Aspects 1-23.

Aspect 30: An apparatus for wireless communication at a device, the apparatus comprising one or more memories and one or more processors coupled to the one or more memories, the one or more processors individually or collectively configured to cause the device to perform the method of one or more of Aspects 1-23.

The foregoing disclosure provides illustration and description but is neither exhaustive nor limiting of the scope of this disclosure. For example, various aspects and examples are disclosed herein, but this disclosure is not limited to the precise form in which such aspects and examples are described. Modifications and variations may be made in light of the above disclosure or may be acquired from practice of the aspects.

As used herein, the term "component" shall be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. Systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and/or measuring, among other examples. Also, "determining" can include receiving (such as receiving information), accessing (such as accessing data stored in memory), and/or transmitting (such as transmitting information), among other examples. As another example, "determining" can include resolving, selecting, obtaining, choosing, establishing, and/or other such similar actions.

Even though particular combinations of features are recited in the claims and/or disclosed in the specification, these combinations do not limit the scope of the disclosure. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As used herein, a phrase referring to "at least one of" a list of items refers to any combination of those items, including single members. As an example, "at least one of: a, b, or c" covers a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" include one or more items and may be used interchangeably with "one or more." Further, as used herein, the article "the" may include one or more items referenced in connection with the article "the" and may be used interchangeably with "the one or more." Furthermore, as used herein, the terms "set" and "group" may include one or more items and may be used interchangeably with "one or more." Where only one item is intended, the phrase "only one" or similar language is used. Also, as used herein, the terms "has," "have," "having," and similar terms are open-ended terms that do not limit an element that they modify (for example, an element "having" A may also have B). Further, the phrase "based on" means "based on or otherwise in association with" unless explicitly stated otherwise. Also, as used herein, the term "or" is inclusive when used in a series and may be used interchangeably with "and/or," unless explicitly stated otherwise (for example, if used in combination with "either" or "only one of"). Further, "one or more" may be equivalent to "at least one."

Even though particular combinations of features are recited in the claims or disclosed in the specification, these combinations are not limiting of the disclosure of various aspects. Many of these features may be combined in ways not specifically recited in the claims or disclosed in the specification. The disclosure of various aspects includes each dependent claim in combination with every other claim in the claim set.

What is claimed is:

1. A first network entity for wireless communication, comprising:
a processing system configured to:

receive, from a second network entity, an encoded communication; and decode the encoded communication to obtain a communication via a list-based decoding scheme that includes respective parity check operations for each list of decoded information of a set of one or more lists of decoded information and a respective parity parameter for each list of the set of one or more lists, the respective parity check operations being configured to be performed prior to a cyclic redundancy check (CRC) operation for the set of one or more lists.

2. The first network entity of claim 1, wherein the processing system, to decode the encoded communication, is configured to:

obtain log likelihood ratio (LLR) information associated with the encoded communication;

perform, using the LLR information and using the list-based decoding scheme, a decoding operation to obtain the set of one or more lists, wherein the decoding operation includes the respective parity check operations for each list of the set of one or more lists; and perform the CRC operation using one or more lists of decoded information, from the set of one or more lists, that have a respective passing result for the respective parity check operations.

3. The first network entity of claim 2, wherein, for each list of the set of one or more lists, the respective parity parameter is based on a quantity of binary one bits included in that list, wherein the respective parity parameter indicates whether the quantity of binary one bits is an even value or an odd value, and wherein the respective passing result is associated with the respective parity parameter matching a parity type for the list-based decoding scheme.

4. The first network entity of claim 3, wherein the parity type is even parity or odd parity.

5. The first network entity of claim 2, wherein the processing system, to perform the decoding operation, is configured to:

discard any lists, from the set of one or more lists, that are associated with a respective failing result for the respective parity check operations.

6. The first network entity of claim 2, wherein the processing system, to perform the decoding operation, is configured to:

generate, for each list of the set of one or more lists, respective partial parity parameters for respective decoded bits included in that list, wherein the respective parity parameter for that list is a partial parity parameter of a last decoded bit included in that list.

7. The first network entity of claim 6, wherein the processing system, to generate partial parity parameters for a list of the set of one or more lists, is configured to:

obtain, via the list-based decoding scheme, a first decoded bit of decoded bits included in the list;

generate, based on a first value of the first decoded bit, a first partial parity parameter for the list indicating whether a quantity of binary one bits included in the list is an even value or an odd value;

obtain, via the list-based decoding scheme, a second decoded bit of the decoded bits; and generate, based on a second value of the second decoded bit and the first partial parity parameter, a second partial parity parameter for the list indicating whether the quantity of binary one bits included in the list is the even value or the odd value.

8. The first network entity of claim 2, wherein the processing system, to perform the decoding operation, is configured to:

generate, for each list of the set of one or more lists, respective partial parity parameters for respective sets of one or more decoded bits included in that list, wherein the respective parity parameter for that list is a partial parity parameter of a last set of one or more decoded bits included in that list.

9. The first network entity of claim 2, wherein the processing system is further configured to:

obtain an indication of a location of CRC information in the encoded communication, and wherein the processing system, to perform the decoding operation, is configured to:

exclude the CRC information as part of the respective parity check operations.

10. A first network entity for wireless communication, comprising:

a processing system configured to:

encode, using a list-decodable coding scheme, first information for a communication to obtain an encoded communication, wherein the encoded communication is based on interleaved information that includes cyclic redundancy check (CRC) information, the first information, and a parity indication, and wherein the CRC information is based on the first information and the parity indication; and transmit, to a second network entity, the encoded communication.

11. The first network entity of claim 10, wherein the processing system, to encode the first information, is configured to:

append the parity indication to the first information prior to a CRC operation associated with the CRC information.

12. The first network entity of claim 10, wherein the processing system, to encode the first information, is configured to:

encode, using the list-decodable coding scheme, the interleaved information to obtain the encoded communication.

13. A method of wireless communication performed by a first network entity, comprising:

receiving, from a second network entity, an encoded communication; and decoding the encoded communication to obtain a communication via a list-based decoding scheme that includes respective parity check operations for each list of decoded information of a set of one or more lists of decoded information and a respective parity parameter for each list of the set of one or more lists, the respective parity check operations being configured to be performed prior to a cyclic redundancy check (CRC) operation for the set of one or more lists.

14. The method of claim 13, wherein decoding the encoded communication comprises:

obtaining log likelihood ratio (LLR) information associated with the encoded communication;

performing, using the LLR information and using the list-based decoding scheme, a decoding operation to obtain the set of one or more lists, wherein the decoding operation includes the respective parity check operations for each list of the set of one or more lists; and performing the CRC operation using one or more lists from the set of one or more lists, that have a respective passing result for the respective parity check operations.

15. The method of claim 14, wherein, for each list of the set of one or more lists, the respective parity parameter is based on a quantity of binary one bits included in that list, wherein the respective parity parameter indicates whether the quantity of binary one bits is an even value or an odd value, and wherein the respective passing result is associated with the respective parity parameter matching a parity type for the list-based decoding scheme.

16. The method of claim 15, wherein the parity type is even parity or odd parity.

17. The method of claim 14, wherein performing the decoding operation comprises:
discarding any lists, from the set of one or more lists, that are associated with a respective failing result for the respective parity check operations.

18. The method of claim 14, wherein performing the decoding operation comprises:
generating, for each list of the set of one or more lists, respective partial parity parameters for respective decoded bits included in that list, wherein the respective parity parameter for that list is a partial parity parameter of a last decoded bit included in that list.

19. The method of claim 18, wherein partial parity parameters for a list of the set of one or more lists comprises:
obtaining, via the list-based decoding scheme, a first decoded bit of decoded bits included in the list;
generating, based on a first value of the first decoded bit, a first partial parity parameter for the list indicating whether a quantity of binary one bits included in the list is an even value or an odd value;
obtaining, via the list-based decoding scheme, a second decoded bit of the decoded bits; and
generating, based on a second value of the second decoded bit and the first partial parity parameter, a second partial parity parameter for the list indicating whether the quantity of binary one bits included in the list is the even value or the odd value.

20. The method of claim 14, wherein performing the decoding operation comprises:
generating, for each list of the set of one or more lists, respective partial parity parameters for respective sets of one or more decoded bits included in that list, wherein the respective parity parameter for that list is a partial parity parameter of a last set of one or more decoded bits included in that list.

\* \* \* \* \*